(12) United States Patent
Yoshida

(10) Patent No.: US 11,137,860 B2
(45) Date of Patent: Oct. 5, 2021

(54) DISPLAY DEVICE HAVING POSITION INPUT FUNCTION

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 421 days.

(21) Appl. No.: 16/372,447

(22) Filed: Apr. 2, 2019

(65) Prior Publication Data

US 2019/0310728 A1 Oct. 10, 2019

(30) Foreign Application Priority Data

Apr. 6, 2018 (JP) .............................. JP2018-073870

(51) Int. Cl.
*G06F 3/044* (2006.01)
*G06F 3/047* (2006.01)

(52) U.S. Cl.
CPC .............. *G06F 3/044* (2013.01); *G06F 3/047* (2013.01); *G06F 2203/04111* (2013.01)

(58) Field of Classification Search
CPC ........ G06F 3/0443; G06F 3/044; G06F 3/047; G06F 3/041–3/0412; G06F 3/0448; G02F 1/13338; G02F 1/133345
See application file for complete search history.

(56) References Cited

U.S. PATENT DOCUMENTS

| 2012/0218199 | A1* | 8/2012 | Kim | .................. G02F 1/136286 345/173 |
| 2016/0274397 | A1* | 9/2016 | Zhou | ................. G02F 1/134309 |
| 2017/0103247 | A1 | 4/2017 | Mizuhashi et al. | |

FOREIGN PATENT DOCUMENTS

JP 2017-73054 A 4/2017

* cited by examiner

*Primary Examiner* — Sanjiv D. Patel
(74) *Attorney, Agent, or Firm* — Keating & Bennett, LLP

(57) ABSTRACT

A display device having position input function includes: a pixel electrode; a common electrode at least partially overlapping with the pixel electrode via an insulating film; position detection electrodes obtained by dividing the common electrode, forming capacitance between a positon input body performing position input and the position detection electrodes, and detecting an input position by the position input body; a position detection line supplying a position detection signal and a common signal for bringing the position detection electrode into a reference potential in a time-divisional manner; a first line through which a drive signal is transmitted; a second line crossing the first line; and a switching element connected to the first line, the second line and the position detection electrode, the switching element connecting the second line to the position detection electrode when driven by the drive signal transmitted to the first line.

15 Claims, 17 Drawing Sheets

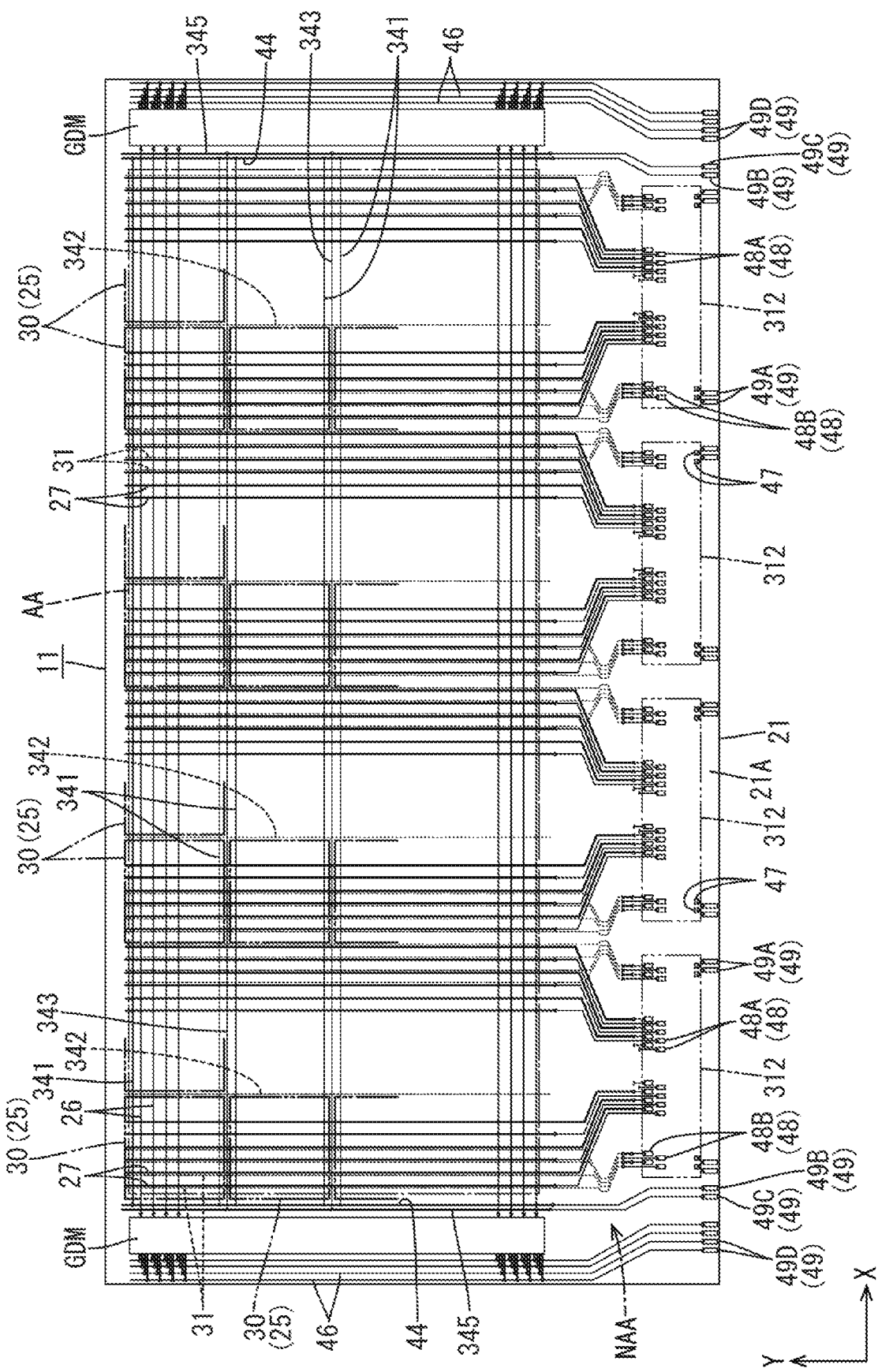

DISPLAY DEVICE HAVING POSITION INPUT FUNCTION

CROSS REFERENCE TO RELATED APPLICATION

This application claims priority from Japanese Patent Application No. 2018-073870 filed on Apr. 6, 2018. The entire contents of the priority application are incorporated herein by reference.

TECHNICAL FIELD

The technology described herein relates to a display device having a position input function.

BACKGROUND

Conventionally, as one example of a display device having a sensor, one described in Japanese Patent Application Laid-Open No. 2017-73054 (PTL 1) is known. A sensor provided in the display device having a sensor described in Japanese Patent Application laid-Open No. 2017-73054 is provided with a first control line, a first signal line, a first detection switch, a common electrode, a first detection electrode, a first circuit, and a second circuit. The common electrode is located above the first control line, the first signal line and the first detection switch, and it is opposite to the first control line, the first signal line and the first detection switch. The first detection electrode is located above the common electrode. The first circuit and the second circuit are located below the common electrode, and they are opposite to the common electrode.

In the Japanese Patent Application Laid-Open No. 2017-73054 described above, a configuration where a pixel electrode provided in a liquid crystal display panel is used as a detection electrode and two pixel electrodes (detection electrodes) are connected to one common line via two detection switches is described. However, when an image signal for display and a writing signal for detection are supplied to the pixel electrode in a time-divisional manner, it is difficult to retain the pixel electrode at a potential required for display during displaying, which may result in lowering of display integrity.

SUMMARY

The technology described herein has been made in view of the above circumstances and an object thereof is to improve the display integrity.

A display device having a position input function of the technology described herein includes: a pixel electrode; a common electrode arranged at least partially overlapping with the pixel electrode via an insulating film; two or more position detection electrodes obtained by dividing the common electrode, the two or more position detection electrodes forming an electrostatic capacitance between a positon input body performing position input and the position detection electrodes and detecting a position of the position input performed by the position input body; a position detection line connected to the position detection electrode and supplying a position detection signal and a common signal for bringing the position detection electrode into a reference potential in a time-divisional manner; a first line through which a drive signal is transmitted; a second line extending so as to cross the first line; and a switching element connected to the first line, the second line and the position detection electrode, the switching element connecting the second line to the position detection electrode when driven by the drive signal transmitted to the first line.

By adopting such a configuration, a potential difference based upon a voltage supplied to the pixel electrode can occur between the pixel electrode and the common electrode having at least a portion overlapping with the pixel electrode via the insulating film, and an image is displayed by utilizing the potential difference. On the other hand, the two or more position detection electrodes obtained by dividing the common electrode form an electrostatic capacitance between the position detection electrodes and a position input body for performing position input, and can detect an input position. Since the touch line supplies the touch signal and the common signal for bringing the touch electrode into the reference potential to the touch electrode connected to the touch line in a time-divisional manner, the above-described position detection function and image display function can be performed.

By the way, as described above, the touch signal and the common signal are supplied to the touch electrode in a time-divisional manner, but a concern is the occurrence of a potential difference between the two or more touch electrodes at the timing of switching between these signals. That is, depending on the arrangement of the touch electrodes, or the like, a voltage drop may occur in the first common signal to be supplied to the touch electrode due to the line resistance of the touch line connected to the touch electrode and a touch electrode which fails to reach the predetermined potential may occur. However, since the TFT can connect the second line to the touch electrode when the TFT is driven by the drive signal transmitted to the first line, for example, by configuring the second line to be supplied with the second common signal, the common signal is supplied from the second line to the touch electrode via the TFT. Therefore, even if the voltage drop occurs in the first common signal supplied from the touch line to the touch electrode, the touch electrode can be charged to the predetermined reference potential, and the potential difference becomes difficult to occur between the two or more touch electrodes. In addition, for example, by connecting the second line to the two or more touch electrodes via the TFT, the two or more touch electrodes can be short-circuited by the second line, so that the potential difference becomes difficult to occur between the two or more touch electrodes. Further, since the configuration where the touch signal and the first common signal are supplied to the touch electrodes obtained by diving the common electrode in a time-divisional manner is assumed, it is easy to retain the common electrode at the reference potential during displaying, as compared with a case where the image signal for display and the writing signal for detection are supplied to the pixel electrode in a time-divisional manner like a conventional case, and display integrity is difficult to lower. As described above, a good display integrity is achieved.

According to the technology described herein, the display integrity can be improved.

BRIEF DESCRIPTION OF THE DRAWINGS

FIG. 17 is a plan view showing a touch electrode, a touch line, a gate line, a source line, and the like, in a liquid crystal panel according to a fourth embodiment.

DETAILED DESCRIPTION

First Embodiment

A first embodiment will be described with reference to FIG. 1 to FIG. 11. In the present embodiment, a liquid crystal display device 10 provided with a display function and a touchscreen function (position input function) (display device having a position input function) will be exemplified. Incidentally, an X axis, a Y axis, and a Z axis are shown in a portion of each drawing, and are depicted to have their respective axial directions as indicated in each drawing. Further, upper sides of FIG. 4, FIG. 6, FIG. 7 and FIG. 9 are defined as a front side, while lower sides thereof are defined as a back side.

Figure 1:
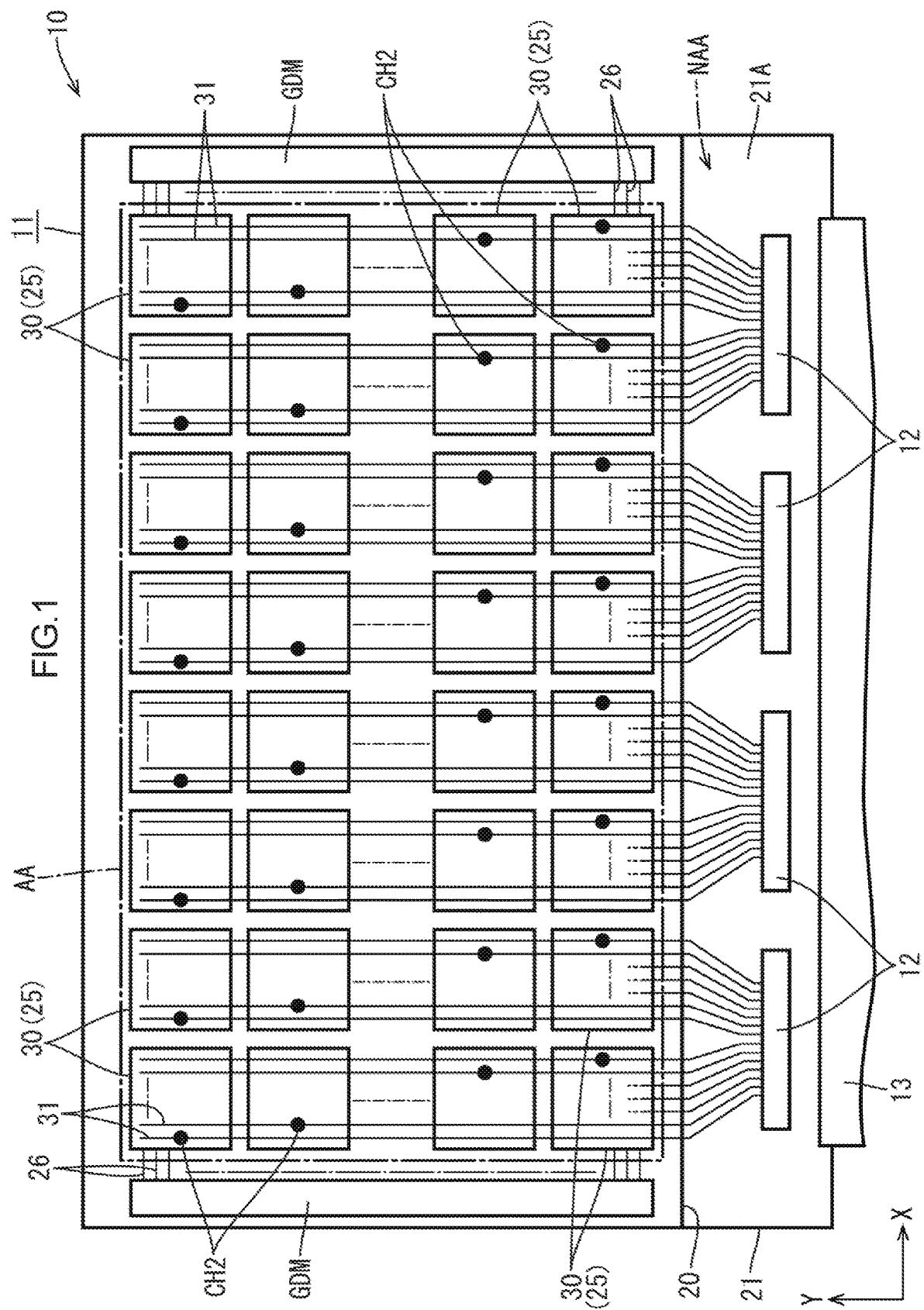
FIG. 1 is a plan view schematically showing a touch electrode, a touch line, and the like, provided in a liquid crystal display device according to a first embodiment.

FIG. 1 is a schematic plan view of a liquid crystal panel 11. As shown in FIG. 1, a liquid crystal display device 10 is at least provided with the liquid crystal panel (display panel having a position input function) 11 having a horizontally-long rectangular shape and being capable of displaying an image, and a backlight device (lighting device) which is an external light source for irradiating the liquid crystal panel 11 with light utilized for display. In the present embodiment, a screen size of the liquid crystal panel 11 is set for example at about 16 inches (specifically, 16.1 inches) and a resolution thereof is set equivalently to "FHD". The backlight device is arranged on a back side (back face side) of the liquid crystal panel 11, and it has a light source (for example, an LED, or the like) for emitting light in white color (white light), an optical member for providing an optical action to the light from the light source to convert the light into planar light, and the like. Incidentally, illustration of the backlight device is omitted.

As shown in FIG. 1, the liquid crystal panel 11 is configured such that a central portion of a screen thereof is defined as an active area (range surrounded by a dot-and-dash line in FIG. 1) AA on which an image is displayed. On the other hand, a bezel-like outer peripheral portion surrounding the active area AA of the screen of the liquid crystal panel 11 is defined as a non-active area NAA where an image is not displayed. The liquid crystal panel 11 is formed by bonding a pair of substrates 20 and 21 together. Of the pair of substrates 20 and 21, a substrate on the front side (front face side) is a CF substrate (opposite substrate) 20, while a substrate on the back side (a back face side) is an array substrate (active matrix substrate, element substrate) 21. The CF substrate 20 and the array substrate 21 are both obtained by forming various films on an inner face side of a glass substrate in a layered manner. Incidentally, a polarizing plate (not shown) is bonded to each of outer face sides of both of the substrates 20 and 21. The CF substrate 20 is configured such that a short-side dimension thereof is shorter than a short-side dimension of the array substrate 21, and the CF substrate 20 is bonded to the array substrate 21 such that one end portions thereof in a short-side direction (Y-axis direction) coincides with each other. Therefore, the other end portion of the array substrate 21 in the short-side direction projects laterally from the CF substrate 20 to form a CF-substrate non-overlapping portion 21A which does not overlap with the CF substrate 20. The CF-substrate non-overlapping portion 21A is mounted with a driver (a drive circuit portion) 12 and a flexible substrate (a signal transmission portion) 13 for supplying various signals relating to a display function and a touchscreen function described next. The driver 12 is composed of an LSI chip having a drive circuit therein, is COG (Chip On Glass)-mounted to the array substrate 21, and processes various signals transmitted by the flexible substrate 13. In the present embodiment, in the non-active area NAA of the liquid crystal panel 11, four drivers 12 are arranged in a line at intervals along the X-axis direction. The flexible substrate 13 has a configuration where a pattern of a large number of lines (not shown) is formed on a base material made of a synthetic resin material having insulation and flexibility (for example, polyimide-based resin or the like). The flexible substrate 13 has one end side and the other end side connected to the non-active area NAA of the liquid crystal panel 11 and a control substrate (signal supply source, not shown), respectively. Various signals supplied from the control substrate are transmitted to the liquid crystal panel 11 via the flexible substrate 13 and they are processed in the non-active area NAA by the drivers 12 and outputted to the active area AA. Further, a pair of gate circuit portions GDM are provided in the non-active area NAA of the array substrate 21 to sandwich the active area AA from both sides thereof in the X-axis direction. The gate circuit portion GDM is for supplying a scanning signal to a gate line 26 described later.

The liquid crystal panel 11 according to the present embodiment has both the display function for displaying an image and the touchscreen function for detecting a position inputted by a user (input position) based upon the displayed image, and is integrated with a touchscreen pattern for performing the touchscreen function of these functions (in-cell technology). This touchscreen pattern is of a socalled projective electrostatic capacitance type, and a detection type thereof is of a self-capacitance type. As shown in FIG. 1, the touchscreen pattern is composed of two or more touch electrodes (position detection electrodes) 30 arranged in a matrix within a plate face of the liquid crystal panel 11. The touch electrodes 30 are provided in the active area AA of the liquid crystal panel 11. Therefore, the active area AA in the liquid crystal panel 11 substantially coincides with a touch area (position input area) capable of detecting the input position, and the non-active area NAA substantially coincides with a non-touch area (non-position input area) where it is not able to detect the input position. When a user brings his/her finger (position input body, not shown) which is a conductor close to a surface (a display face) of the liquid crystal panel 11 in order to perform position input based upon an image on the active area AA of the liquid crystal panel 11 visually recognized by him/her, an electrostatic capacitance is formed between the finger and the touch electrode 30. Thereby, since an electrostatic capacitance detected by the touch electrode 30 close to the finger varies as the finger approaches and becomes different from that of the touch electrode 30 far from the finger, the input position can be detected based upon the difference. The touch electrodes 30 are arranged at intervals in a matrix in the active area AA such that two or more touch electrodes 30 are arranged along the X-axis direction (arrangement direction of the pixel electrodes 24 sandwiching the touch line 31) and two or more touch electrodes 30 are arranged along the Y-axis direction (extension direction of the touch line 31). The touch electrode 30 is formed in a substantially rectangular shape in plan view, and a length of one side thereof is set at about several millimeters (for example, about 2 mm to 6 mm), preferably at about 4.1 mm. Therefore, the size of the touch electrode 30 in plan view is significantly larger than a pixel portion PX described later, and the touch electrode 30 is positioned across a range of two or more (for example, about several tens of) pixel portions PX in each of the X-axis direction and the Y-axis direction. The two or more touch lines (position detection lines) 31 provided in the liquid crystal panel 11 are selectively connected to the two or more touch electrodes 30. The touch lines 31 extend along the Y-axis direction, and they are selectively connected to a specific touch electrode 30 of the two or more touch electrodes 30 arranged along the Y-axis direction. More specifically, in the present embodiment, the touch lines 31 are arranged such that two or more thereof overlap with a column composed of two or more touch electrodes 30 arranged along the Y-axis direction, and one touch line 31 is selectively connected to each of the touch electrodes 30 in the column. Incidentally, in FIG. 1, a connection portion of the touch line 31 to the touch electrode 30 is shown with a black dot. Further, the touch lines 31 are connected to a detection circuit (not shown). The detection circuit may be provided in the driver 12, or it may be provided outside the liquid crystal panel 11 via the flexible substrate 13. Incidentally, FIG. 1 schematically shows an arrangement of the touch electrodes 30, and, besides the example shown, a specific number of installed touch electrodes 30, a specific arrangement thereof, a specific planar shape thereof, and the like, can be modified where appropriate.

Figure 2:
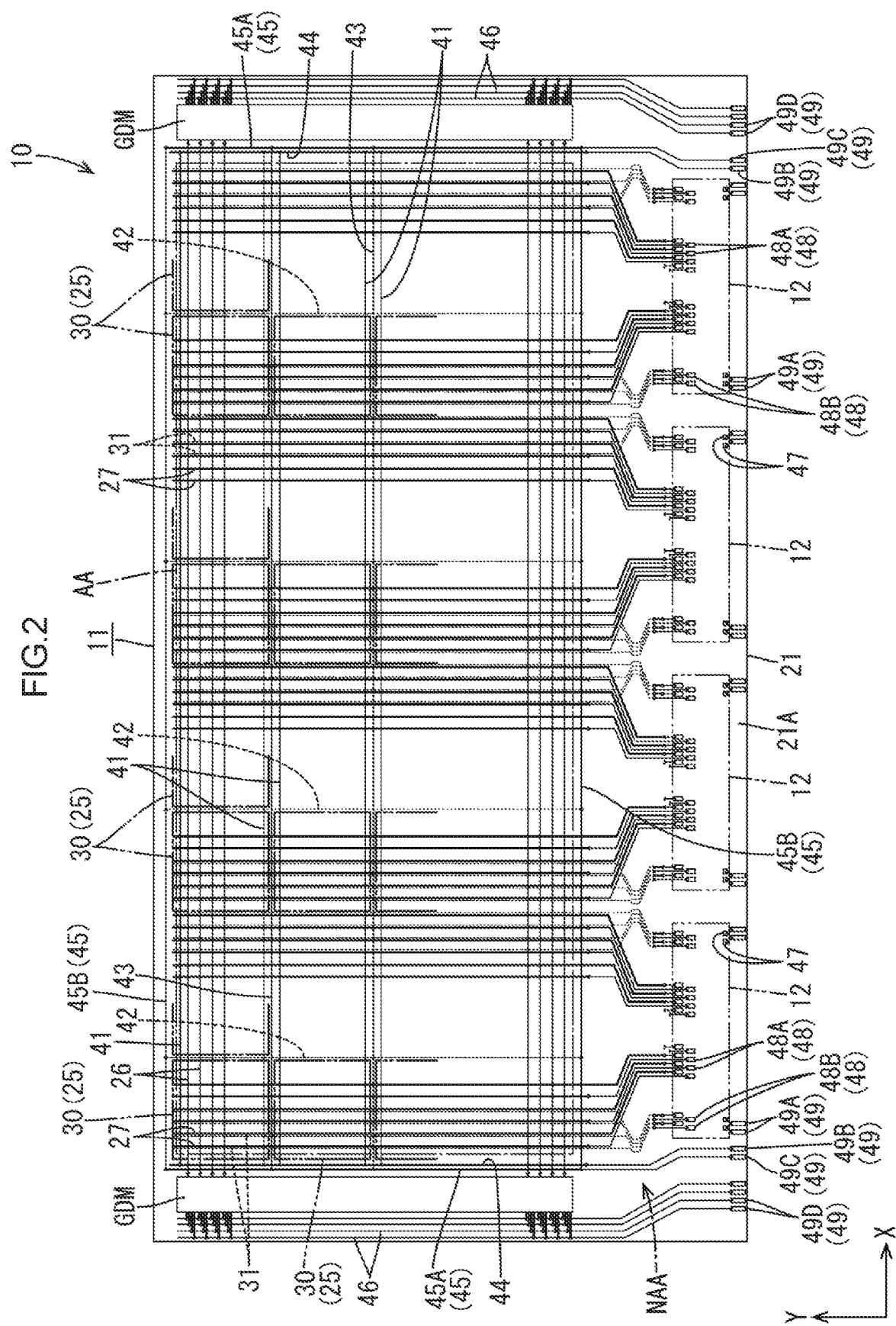
FIG. 2 is a plan view showing the touch electrode, the touch line, a gate line, a source line, and the like, of the liquid crystal panel.

FIG. 2 is a plan view showing the touch electrodes 30, the touch lines 31, the gate lines 26, source lines 27, and the like, of the liquid crystal panel 11. Incidentally, in FIG. 2, a first metal film 32, a second metal film 35, and a third metal film 38 described later are shown in a thin solid line, a thick solid line, and a broken line, respectively. As shown in FIG. 2, the active area AA of the array substrate 21 is provided with a gate line (scanning line) 26 for supplying a scanning signal to a pixel TFT 23 described later, a source line (signal line, data line) 27 for supplying an image signal (data signal) to the pixel TFT 23, the touch line 31 extending in parallel with the source line 27, a first line 41 extending in parallel with the gate line 26, a second line 42 extending in parallel with the source line 27 and the touch line 31, and a third line 43 extending in parallel with the gate line 26 and the first line 41. The gate line 26, the first line 41 and the third line 43 extend approximately along the X-axis direction, whereas the source line 27, the touch line 31 and the second line 42 extend approximately along the Y-axis direction to cross the gate line 26, the first line 41 and the third line 43. Incidentally, the first line 41, the second line 42 and the third line 43 will be described later in detail. A bezel-like portion of the non-active area NAA of the array substrate 21 adjacent to the active area AA and surrounding the active area AA is provided with a drive signal supply line (drive signal supply portion) 44 connected to the first line 41, and a common signal supply line (common signal supply portion) 45 connected to the second line 42 and the third line 43. The common signal supply line 45 will also be described in detail later. Further, a line for a gate circuit 46 for supplying a signal to the gate circuit portion GDM is provided in the non-active area NAA of the array substrate 21 on the side of the gate circuit portion GDM opposite to the active area AA. An output terminal portion for a driver 47 for outputting a signal to the driver 12 and an input terminal portion for a driver 48 into which a signal from the driver 12 is inputted are provided in a mounting area of each driver 12 in the CF-substrate non-overlapping portion 21A which is the non-active area NAA of the array substrate 21. The input terminal portion for a driver 48 includes a terminal portion for a source line (an image signal supply portion) 48A connected to a led-out portion of the source line 27 provided in the active area AA to supply an image signal to the source line 27 and a terminal portion for a touch line (a position detection signal supply portion) 48B connected to a led-out portion of the touch line 31 provided in the active area AA to supply a touch signal (a position detection signal) and a first common signal (a common signal) to the touch line 31 in a time-divisional manner. A mounting area for the flexible substrate 13 in the CF-substrate non-overlapping portion 21A of the array substrate 21 is provided with a terminal portion for a flexible substrate 49 connected to the flexible substrate 13. The terminal portion for a flexible substrate 49 includes a terminal portion for a driver 49A connected to the output terminal portion for a driver 47, a drive signal supply terminal portion 49B connected to the drive signal supply line 44, a common signal supply terminal portion 49C connected to the common signal supply line 45, and a terminal portion for a gate circuit 49D connected to the line for a gate circuit 46.

Figure 3:
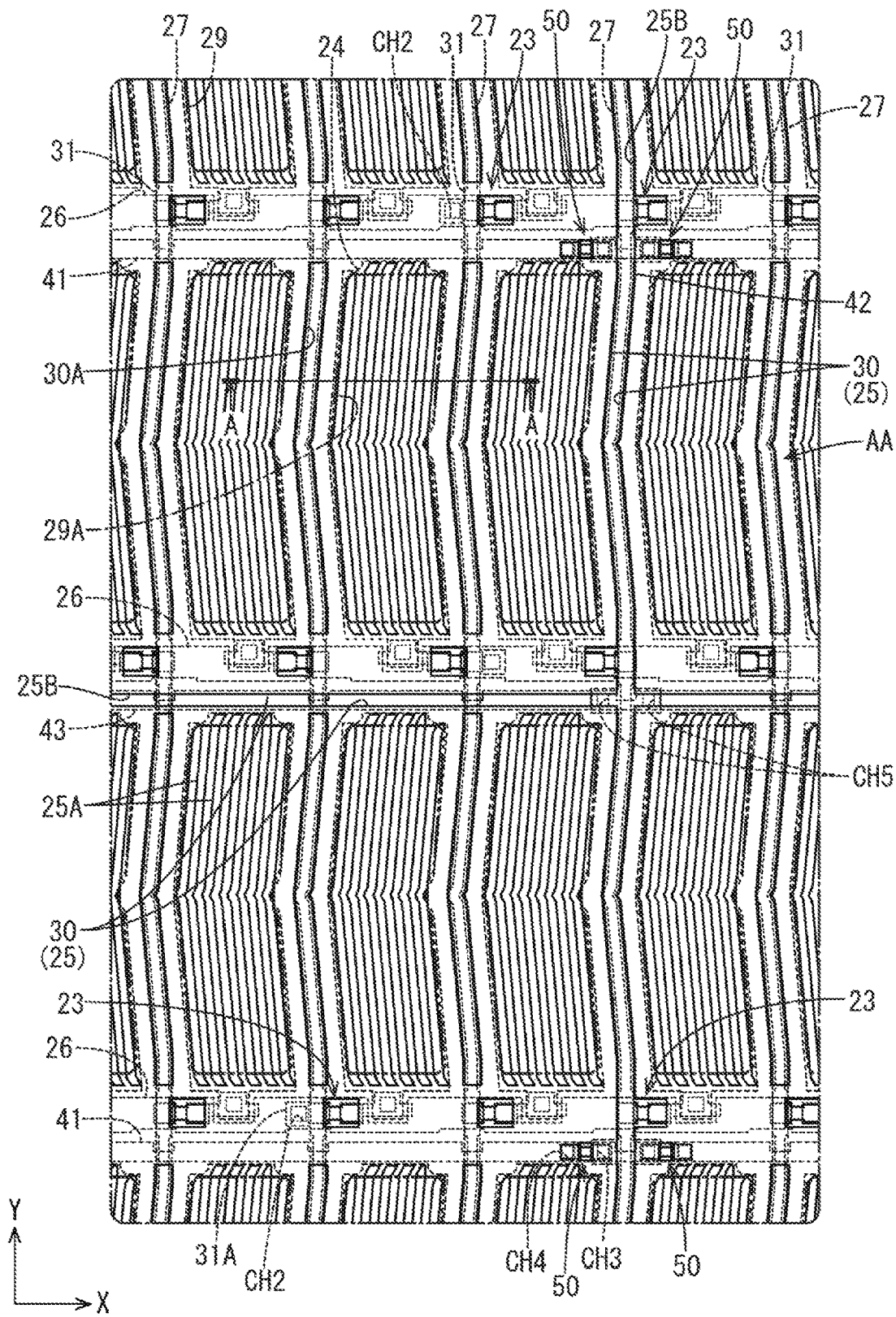
FIG. 3 is a plan view showing a pixel array in the liquid crystal panel.

FIG. 3 is a plan view of the active area AA of the array substrate 21 configuring the liquid crystal panel 11. As shown in FIG. 3, the touch electrode 30 is provided with a touch line overlapping opening portion (position detection line overlapping opening portion) 30A arranged to overlap with a portion of the touch line 31. The touch line overlapping opening portions 30A each extend to be parallel with the Y-axis direction which is the extension direction of the touch line 31, and have a vertically-long shape in plan view (a longitudinal shape when the extension direction of the touch line 31 is defined as a longitudinal direction). Further, a widthwise dimension (a dimension in the X-axis direction) of the touch line overlapping opening portion 30A is larger than a widthwise dimension of the touch line 31. Thus, the touch line overlapping opening portions 30A are arranged to overlap with at least portions of the touch lines 31, so that a parasitic capacitance which may occur between the touch line 31 and the touch electrode 30 not connected with the touch line 31 is reduced. Thereby, a good sensitivity relating to the position detection is achieved.

As shown in FIG. 3, a pixel TFT (pixel switching element) 23 and a pixel electrode 24 are provided on an inner face side in the active area AA of the array substrate 21 configuring the liquid crystal panel 11. As the pixel TFTs 23 and the pixel electrodes 24, a large number of pixel TFTs 23 and a large number of pixel electrodes 24 are provided at intervals in a matrix (rows and columns) along the X-axis direction and along the Y-axis direction. The gate lines 26 and the source lines 27 orthogonal to (crossing) each other are arranged around the pixel TFTs 23 and the pixel electrodes 24. The gate lines 26 and the source lines 27 are connected to gate electrodes 23A and source electrodes 23B of the pixel TFTs 23, respectively, and the pixel electrodes 24 are connected to drain electrodes 23C of the pixel TFTs 23. The pixel TFTs 23 are driven based upon various signals each supplied to the gate lines 26 and the source lines 27, and they control supplies of potentials to the pixel electrodes 24 along with the drives of the pixel TFTs 23. Further, the pixel TFT 23 are unevenly distributed to the pixel electrodes 24 (the source lines 27) at either the right or left shown in FIG. 3 in the X-axis direction. One pixel TFT 23 positioned at the left side of one pixel electrodes 24 (the source line 27) and another pixel TFT 23 positioned at the right side of another pixel electrode 24 (the source line 27) are alternately repeatedly arranged in the Y-axis direction, and arranged zigzag (in a staggered manner) in plan view. The pixel electrode 24 has a vertically-long substantially rectangular planar shape (more specifically, a long side of the pixel electrode 24 is bent along the source line 27), and a short-side direction thereof and a long-side direction coincide with the extension direction of the gate line 26 and the extension direction of the source line 27, respectively. The pixel electrode 24 is sandwiched from both sides thereof by a pair of gate lines 26 in the Y-axis direction, and it is sandwiched from both sides thereof by a pair of source lines 27 in the X-axis direction. Incidentally, a light-shielding portion (inter-pixel light-shielding portion, a black matrix) 29 shown by a two-dot chain line in FIG. 3 is formed on the CF substrate 20 side. The light-shielding portion 29 has a substantially grid-like planar shape to separate the adjacent pixel electrodes 24 from each other, and it has a pixel opening portion 29A at a position overlapping with most of the pixel electrode 24 in plan view. The pixel opening portion 29A makes it possible to emit transmitted light of the pixel electrode 24 to the outside of the liquid crystal panel 11. The light-shielding portion 29 is arranged to overlap with at least the gate line 26 and the source line 27 (also including the touch line 31, and the like) on the array substrate 21 side in plan view. Incidentally, arrangements of the pixel TFTs 23 and the pixel electrodes 24, and the like, will be described later again.

Figure 4:
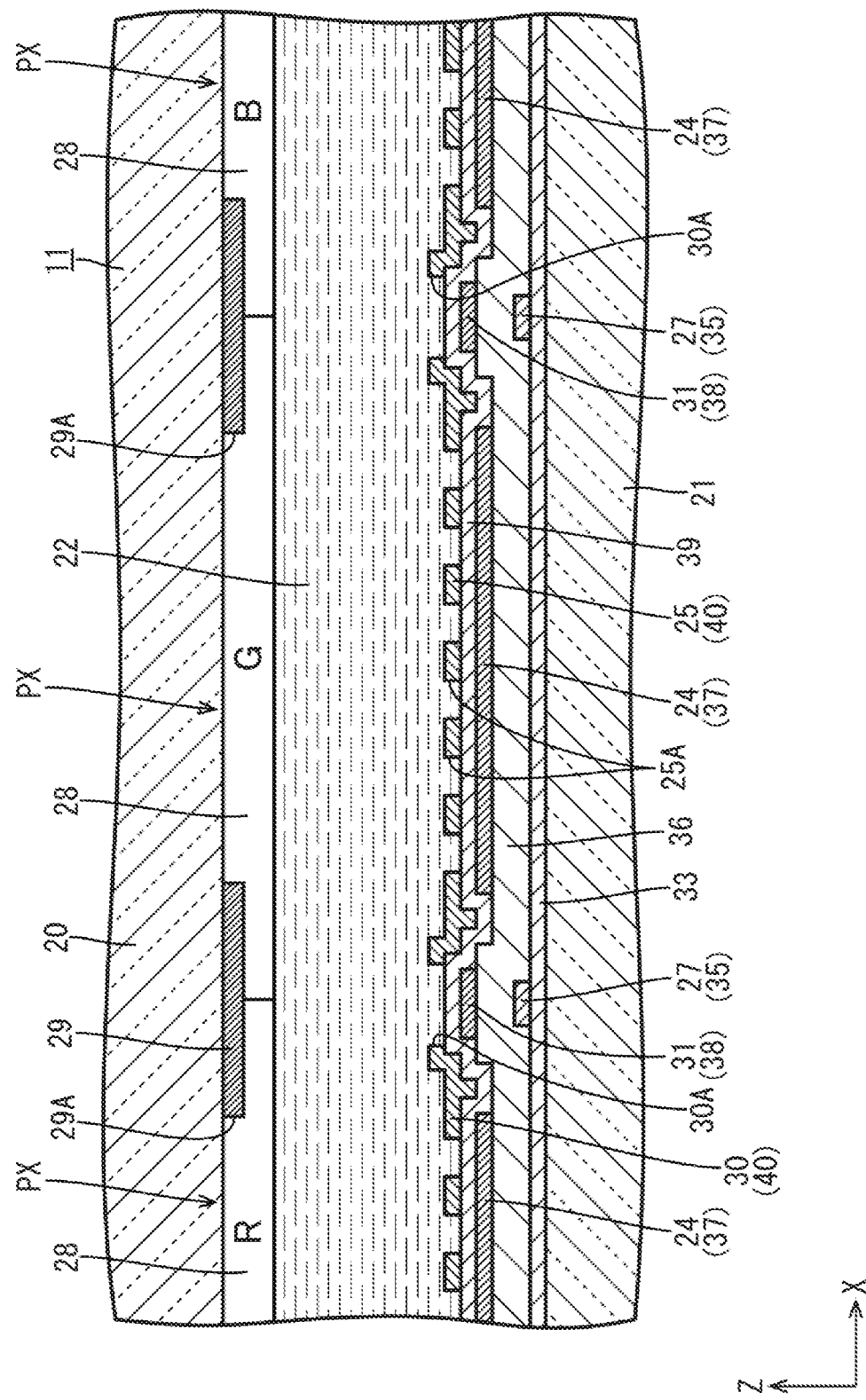
FIG. 4 is a cross-sectional view of the liquid crystal panel taken along line A-A shown in FIG. 3.

FIG. 4 is a cross-sectional view of a vicinity of a central portion of the pixel portion PX in the liquid crystal panel 11. As shown in FIG. 4, the liquid crystal panel 11 has a liquid crystal layer (a medium layer) 22 containing liquid crystal molecules which are substances arranged between the pair of substrates 20 and 21 and having optical characteristics varying along with electric field application. Color filters 28 containing three colors presenting blue (B), green (G) and red (R) are provided in the active area AA on the inner face side of the CF substrate 20 constituting the liquid crystal panel 11. As the color filters 28, a large number of color filters 28 presenting colors different from one another are repeatedly arranged along the gate line 26 (the X-axis direction) and extend along the source line 27 (approximately in the Y-axis direction), so that the color filters 28 are arranged in stripes as a whole. These color filters 28 are arranged to overlap with each pixel electrode 24 on the array substrate 21 side in plan view. The color filters 28 adjacent to one another in the X-axis direction and presenting different colors are arranged to have a boundary (color boundary) therebetween overlapping with the source line 27 and the light-shielding portion 29. In this liquid crystal panel 11, the color filters 28 of R, G and B arranged side by side along the X-axis direction and three pixel electrodes 24 opposite to the respective color filters 28 constitute the pixel portions PX in the three colors, respectively. In this liquid crystal panel 11, the pixel portions PX in the three colors R, G, B adjacent to one another in the X-axis direction constitute a display pixel making color displaying having a predetermined gradation possible. An arrangement pitch of the pixel portions PX in the X-axis direction is set at, for example, about 60 µm (specifically, 62 µm), and an arrangement pitch thereof in the Y-axis direction is set at, for example, about 180 µm (specifically, 186 µm). The light-shielding portion 29 is arranged to separate the adjacent color filters 28 from each other. A planarized film (not shown) arranged in a solid pattern over approximately the whole area of the CF substrate 20 is provided on an upper layer side (on the liquid crystal layer 22 side) of the color filter 28. Incidentally, an orienting film (not shown) orienting the liquid crystal molecules contained in the liquid crystal layer 22 is formed on each innermost face of both of the substrates 20 and 21 contacting with the liquid crystal layer 22.

Subsequently, a common electrode 25 will be described with reference to FIG. 3 and FIG. 4. As shown in FIG. 3 and FIG. 4, a common electrode 25 is formed to overlap with all of the pixel electrodes 24 on the inner face side in the active area AA of the array substrate 21 on an upper layer side beyond the pixel electrodes 24. The common electrode 25 is supplied with a constantly substantially fixed reference potential (common potential) except for a period (sensing period) where the common electrode 25 is supplied with a touch signal and an input position by a finger is detected, they extend over a whole area of the active area AA, and two or more pixel overlapping opening portions (pixel overlapping slits, orientation control slits) 25A extending along the long-side direction of each pixel electrode 24 are formed in an opening manner on a portion of the common electrode 25 overlapping with each pixel electrode 24 (specifically, a pixel electrode main body 24A described later). Incidentally, a specific number of installed pixel overlapping opening portions 25A, a specific shape thereof, a specific formation range thereof, and the like, can be modified where appropriate besides the example shown. When a potential difference between the pixel electrode 24 and the common electrode 25 overlapping with each other occurs along with charging of the pixel electrode 24, a fringe field (an oblique electric field) including a component in a normal direction to a plate face of the array substrate 21 in addition to a component extending along the plate face of the array substrate 21 occurs between an opening edge of the pixel overlapping opening portions 25A and the pixel electrode 24. Therefore, an orientation state of the liquid crystal molecules contained in the liquid crystal layer 22 can be controlled by utilizing this fringe field. That is, the liquid crystal panel 11 according to the present embodiment is made such that an operation mode thereof is an FFS (Fringe Field Switching) mode. The common electrode 25 constitutes the above-described touch electrode 30. The common electrode 25 has a partition opening portion (a partition slit) 25B for separating the adjacent touch electrodes 30 from each other in addition to the above-described pixel overlapping opening portion 25A. The partition opening portion 25B is composed of a portion extending transversely the common electrode 25 over a whole length of the common electrode 25 along the X-axis direction and a portion longitudinally extending the common electrode 25 over the whole length along the Y-axis direction, and it forms a substantially grid-like pattern as a whole in plan view. Incidentally, in FIG. 3, the second line 42 overlapping with the portion of the partition opening portion 25B extending longitudinally and the third line 43 overlapping with the portion of the partition opening portion 25B extending transversely are illustrated. The common electrode 25 is composed of two or more touch electrodes 30 divided in a checkerboard-like pattern in plan view by the partition opening portions 25B to be electrically independent of one another. Therefore, the touch line 31 connected to the touch electrode 30 supplies the first common signal (common signal) relating to the display function and the touch signal (position detection signal) relating to the touch function to the touch electrode 30 at different timings (in a time-divisional manner). The first common signal of these signals is transmitted to all of the touch lines 31 at the same timing, and thereby all of the touch electrodes 30 are brought into a reference potential to function as the common electrode 25.

Figure 5:
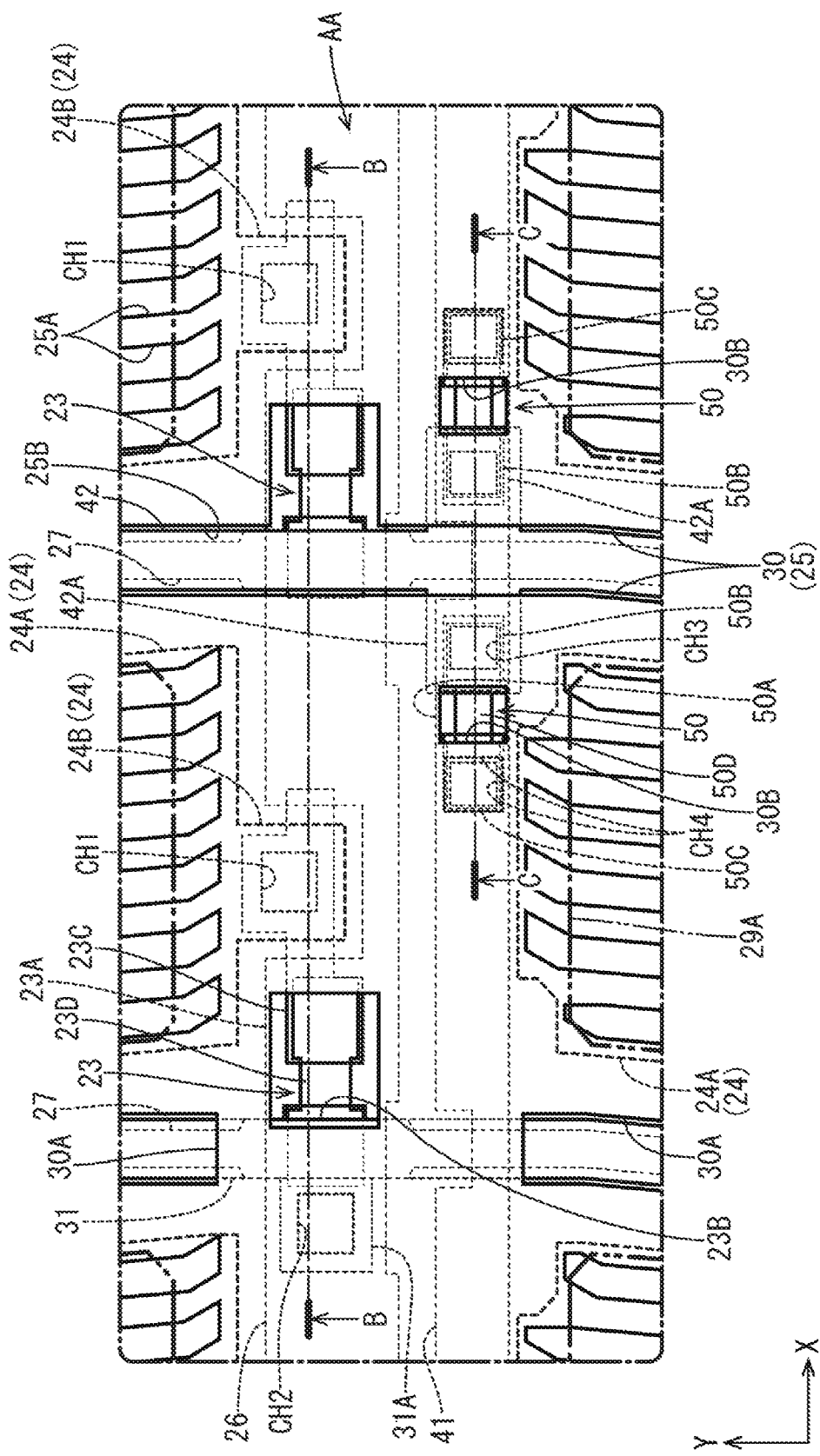
FIG. 5 is a plan view showing a pixel TFT and a vicinity of the TFT in an array substrate and a CF substrate configuring the liquid crystal panel.

Configurations of the pixel TFT 23 and the pixel electrode 24 will be described in detail with reference to FIG. 5. FIG. 5 is an enlarged plan view of a vicinity of the pixel TFT 23 in the array substrate 21. As shown in FIG. 5, the pixel TFT 23 has a horizontally-long shape extending along the X-axis direction as a whole, and it is arranged to be adjacent to the pixel electrode 24 which is to be connected on the lower side of the pixel electrode 24 shown in FIG. 5 in the Y-axis direction. The pixel TFT 23 has a gate electrode 23A composed of a portion of the gate line 26 (portion overlapping with the source line 27 or the like). The gate electrode 23A has a horizontally-long shape extending along the X-axis direction, and it drives the pixel TFT 23 based upon a scanning signal supplied to the gate line 26, and thereby a current between a source electrode 23B and a drain electrode 23C is controlled. The pixel TFT 23 has a source electrode 23B composed of a portion of the source line 27 (portion overlapping with the gate line 26). The source electrode 23B is arranged on one end side of the pixel TFT 23 in the X-axis direction, a substantially whole area thereof overlaps with the gate electrode 23A, and the source electrode 23B is connected to a channel portion 23D. The pixel TFT 23 has the drain electrode 23C arranged in a position spaced from the source electrode 23B, namely, on the other end side of the pixel TFT 23 in the X-axis direction. The drain electrode 23C extends approximately along the X-axis direction, one end side thereof overlaps with the gate electrode 23A to be opposite to the source electrode 23B and it is connected to the channel portion 23D, while the other end side thereof is connected to the pixel electrode 24.

As shown in FIG. 5, the pixel electrode 24 is composed of the pixel electrode main body 24A overlapping with the pixel opening portion 29A of the light-shielding portion 29 and having a substantially rectangular shape and a contact portion 24B projecting toward the pixel TFT 23 from the pixel electrode main body 24A along the Y-axis direction. The contact portion 24B of these portions is arranged to overlap with the other end side of the drain electrode 23C, and these overlapping portions are connected to each other via a pixel contact hole CH1 formed in an opening manner in a first interlayer insulating film 36. Incidentally, the gate line 26 has a cutout coinciding with a range where the gate line 26 overlaps with both of the contact portion 24B and the drain electrode 23C. The cutout is provided in order to reduce a capacity between the gate line 26 and the pixel electrode 24. Further, the other end of the drain electrode 23C overlaps with the gate line 26. This is provided in order to prevent the capacity between the gate line 26 and the drain electrode 23C (namely, the pixel electrode 24) from fluctuating, even if the drain electrode 23C is misaligned with the gate line 26 when the array substrate 21 is manufactured. The pixel TFT 23 has the channel portion 23D overlapping with the gate electrode 23A via a gate insulating film 33 described later and being connected to the source electrode 23B and the drain electrode 23C. The channel portion 23D overlaps with the gate electrode 23A and extends along the X-axis direction, and one end thereof and the other end thereof are connected to the source electrode 23B and the drain electrode 23C, respectively. When the pixel TFT 23 is turned on based upon a scanning signal supplied to the gate electrode 23A, an image signal supplied to the source line 27 is supplied from the source electrode 23B to the drain electrode 23C via the channel portion 23D composed of a semiconductor film 34. As a result, the pixel electrode 24 is charged to a potential based upon the image signal. Incidentally, the common electrode 25 has a cutout coinciding with a range overlapping with the channel portion 23D. This cutout is provided in order to suppress fluctuation of a leak current amount between the source electrode 23B and the drain electrode 23C along with a potential fluctuation of the common electrode 25 (the touch electrode 30) when the pixel TFT 23 is off.

Figure 6:
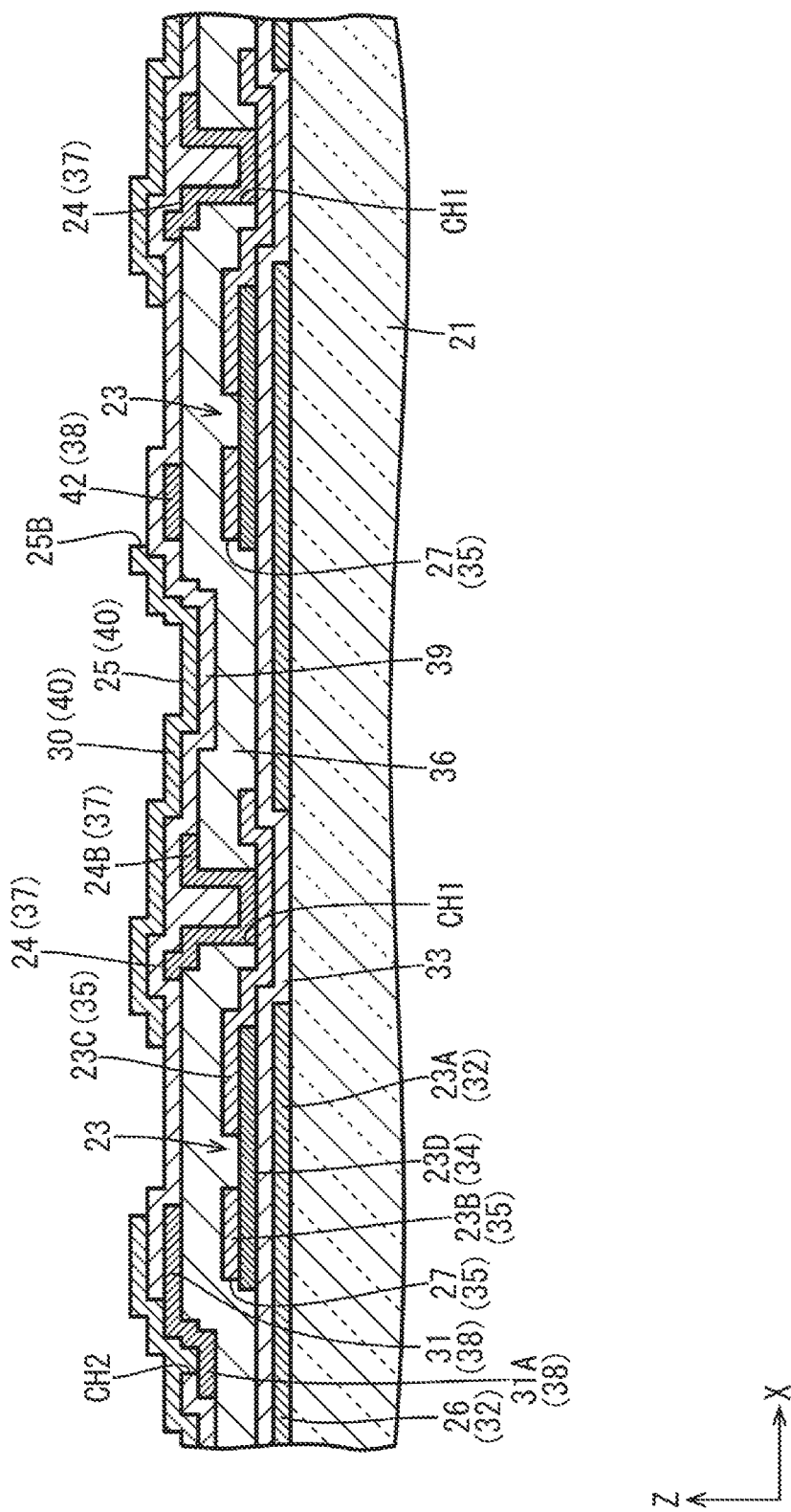
FIG. 6 is a cross-sectional view of the array substrate taken along line B-B shown in FIG. 5.

Here, various films formed on the inner face side of the array substrate 21 in a layered manner will be described with reference to FIG. 6. FIG. 6 is a cross-sectional view of a vicinity of the pixel TFT 23 in the liquid crystal panel 11. As shown in FIG. 6, the first metal film 32, the gate insulating film 33, the semiconductor film 34, the second metal film 35, the first interlayer insulating film 36, a first transparent electrode film 37, the third metal film 38, a second interlayer insulating film 39, and a second transparent electrode film 40 are formed on the array substrate 21 in a layered manner in this order from the lower layer side (the glass substrate side). The first metal film 32, the second metal film 35, and the third metal film 38 are composed of a single-layer film made from a metal material of a kind selected from copper, titanium, aluminum, molybdenum, tungsten, or the like, a layered film or an alloy made of different kinds of metal materials, so that they have conductivity and light-shielding properties. The first metal film 32 constitutes the gate line 26, the gate electrode 23A of the pixel TFT 23, the first line 41, the third line 43, and the like. The second metal film 35 constitutes the source line 27, the source electrode 23B and the drain electrode 23C of the pixel TFT 23, and the like. The third metal film 38 constitutes the touch line 31, the second line 42, and the like. The gate insulating film 33, the first interlayer insulating film 36 and the second interlayer insulating film 39 are made from an inorganic material such as silicon nitride ($SiN_x$) or silicon oxide ($SiO_2$). The gate insulating film 33 keeps insulated from each other the first metal film 32 on the lower layer side and the semiconductor film 34 and the second metal film 35 on the upper layer side. The first interlayer insulating film 36 keeps insulated from each other the semiconductor film 34 and the second metal film 35 on the lower layer side and the first transparent electrode film 37 and the third metal film 38 on the layer upper side. The second interlayer insulating film 39 keeps insulated from each other the first transparent electrode film 37 and the third metal film 38 on the lower layer side and the second transparent electrode film 40 on the upper layer side. The semiconductor film 34 is composed of a thin film made by using, for example, an oxide semiconductor, amorphous silicon, or the like, as a material, and constitutes the channel portion (a semiconductor portion) 23D connected to the source electrode 23B and the drain electrode 23C, or the like, in the pixel TFT 23. The first transparent electrode film 37 and the second transparent electrode film 40 are made from a transparent electrode material (for example, ITO (Indium Tin Oxide), IZO (Indium Zinc Oxide), or the like). The first transparent electrode film 37 constitutes the pixel electrode 24, and the like. The first transparent electrode film 37 and the third metal film 38 together are provided on the upper layer side of the first interlayer insulating film 36 and located in the same layer together. Therefore, it can be said that the pixel electrode 24 composed of the first transparent electrode film 37 and the touch line 31 and the second line 42, and the like, made of the third metal film 38 are provided together in the same layer. The second transparent electrode film 40 constitutes the common electrode 25 (touch electrode 30). Incidentally, in the present embodiment, the touch line 31 and the second line 42 have a single-layer structure composed of the third metal film 38, but, for example, they may have a layered structure composed of the first transparent electrode film 37 and the third metal layer 38.

Subsequently, a configuration of the touch line 31 in the active area AA will be described mainly with reference to FIG. 6, and where appropriate, FIG. 5. As shown in FIG. 6, the touch line 31 is composed of the third metal film 38, and it is arranged to overlap with the source line 27 composed of the second metal film 35 via the first interlayer insulating film 36 in plan view. That is, the touch line 31 is arranged in the same layer as the pixel electrode 24 composed of the first transparent electrode film 37. The touch line 31 extends in parallel with the source line 27 approximately along the Y-axis direction in the active area AA, and it is arranged so as to be spaced in the X-axis direction from and adjacent to a large number of pixel electrodes 24 arranged along the Y-axis direction. The touch line 31 has a pad portion 31A connected to the touch electrode 30 which is to be connected in the active area AA. The pad portion 31A projects partially from a side edge of the touch line 31 along the X-axis direction, and it is arranged to overlap with the gate line 26 (see FIG. 5). The overlapping portions of the pad portion 31A and the touch electrode 30 which is a connection target are connected to each other via a contact hole for a touch line CH2 formed in an opening manner in the second interlayer insulating film 39.

By the way, as described above, the touch electrode 30 is supplied with the touch signal and the first common signal in a time-divisional manner, but a potential difference may occur between two or more touch electrodes 30 at a switching timing between the signals. That is, of the two or more touch electrodes 30 arranged in rows and columns in the active area AA, the touch electrode 30 being located far from the driver 12 has a long creepage distance of the touch line 31 connected, as compared with the touch electrode 30 arranged close to the driver 12, a line resistance of the touch line 31 also becomes high accordingly, which may result in occurrence of a voltage drop in the first common signal supplied. As a result, the touch electrode 30 located far from the driver 12 fails to reach the predetermined reference potential, so that a potential difference occurs with respect to the touch electrode 30 located close to the driver 12. Because of this, block-like or band-like display unevenness following an outer shape of the touch electrode 30 may be visually recognized. Further, when the image signal for display and the writing signal for detection are supplied to the pixel electrode 24 in a time-divisional manner in a conventional manner, it is difficult to retain the common electrode 25 at the reference potential at the display time, which may result in lowering of display integrity.

In view of these circumstances, as shown in FIG. 5, the active area AA of the array substrate 21 according to the present embodiment is provided with a TFT (switching element) 50 connected to the first line 41, the second line 42 and the touch electrode 30. When the TFT 50 is driven by a drive signal supplied from the first line 41, it can connect the second line 42 to the touch electrode 30 to supply the second common signal (common signal) transmitted to the second line 42 to the touch electrode 30. That is, the touch electrode 30 according to the present embodiment can be supplied with the second common signal by the second line 42 and the TFT 50 in addition to the first common signal supplied from the touch line 31. Therefore, even if a voltage drop occurs in the first common signal supplied from the touch line 31 to the touch electrode 30, the touch electrode 30 can be charged to the predetermined reference potential, so that a potential difference is difficult to occur between the two or more touch electrodes 30 provided in the active area AA regardless of the distance from the driver 12. Further, in the present embodiment, since the configuration where the touch signal and the first common signal are supplied to the touch electrodes 30 obtained by dividing the common electrode 25 in a time-divisional manner is assumed, it is easy to retain the common electrode 25 at the reference potential at the display time and the display indignity is difficult to lower, as compared with a conventional case where the image signal for display and the writing signal for detection are supplied to the pixel electrode 24 in a time-divisional manner. Therefore, a good display integrity is achieved.

As shown in FIG. 5, the first line 41 is composed of the same first metal film 32 as the gate line 26, and it is located to be spaced in the Y-axis direction from and adjacent to the gate line 26, and extends in parallel with the gate line 26 approximately along the X-axis direction. The first line 41 is arranged to be sandwiched in the Y-axis direction between the gate line 26 and a group of the pixel electrodes 24 opposite to (the lower side in FIG. 5) a group of the pixel electrodes 24 which is to be connected with the gate line 26. The TFT 50 is provided on the first line 41, and it is arranged to be spaced in the Y-axis direction from and adjacent to the pixel TFT 23 provided on the gate line 26. As the first line 41, two or more first lines 41 are arranged at predetermined intervals in the Y-axis direction, and the number of installed first lines 41 coincides with the number of arranged touch electrodes 30 in the Y-axis direction. The first line 41 is led out to the outside of the active area AA (non-active area NAA), and the led-out end portion of the first line 41 is connected to the drive signal supply line 44 to be supplied with a drive signal from the drive signal supply line 44 (see FIG. 2). A configuration of the drive signal supply line 44 will be described with reference to FIG. 2. As shown in FIG. 2, regarding the drive signal supply line 44, two drive signal supply lines 44 are provided to extend along the Y-axis direction in each area sandwiched between the two gate circuit portions GDM and the active area AA in the non-active area NAA. The drive signal supply line 44 is connected to the drive signal supply terminal portion 49B at one end portion thereof in the extension direction of the drive signal supply line 44. Thus, since the drive signal supply line 44 is arranged to be adjacent to the gate circuit portion GDM and extends in parallel with the second line 42, a space for arranging the drive signal supply line 44 can be reduced, and the drive signal supply lines 44 can supply drive signals collectively to the two or more first lines 41 arranged along the Y-axis direction.

As shown in FIG. 5 and FIG. 6, the second line 42 is composed of the same third metal film 38 as the touch line 31, and it is arranged to overlap with the source line 27 composed of the second metal film 35 via the first interlayer insulating film 36 in plan view. That is, the second line 42 is arranged in the same layer as the pixel electrode 24 composed of the first transparent electrode film 37 in addition to the touch line 31. The second line 42 extends in parallel with the source line 27 approximately along the Y-axis direction in the active area AA, and is arranged to be spaced in the X-axis direction from and adjacent to a large number of pixel electrodes 24 arranged along the Y-axis direction. Therefore, the second line 42 is arranged to sandwich the pixel electrodes 24 between itself and the touch line 31 in the X-axis direction. Here, the respective numbers of installed second lines 42 and the touch lines 31 will be described. First of all, the number of source lines 27 overlapping with one touch electrode 30 to which the touch line 31 is connected takes a value (66 lines in the present embodiment) obtained by dividing a length of one side (4.1 mm in the present embodiment) of the touch electrode 30 by the arrangement pitch (62 μm in the present embodiment) of the pixel portion PX in the X-axis direction. If the touch lines 31 are arranged to overlap with all of the source lines 27, when the touch lines 31 are connected to two or more (fifty in the present embodiment) touch electrodes 30 arranged along the Y-axis direction in a row one by one, a surplus of the touch lines 31 is generated. In the present embodiment, the surplus number of touch lines 31 overlapping with the touch electrode 30 is sixteen, and the surplus number of touch lines 31 interposed between the touch electrodes 30 adjacent to each other in the X-axis direction is one. In view of these circumstances, in the present embodiment, of the seventeen surplus touch lines 31 in total with respect to the column of the touch electrodes 30 arranged in the Y-axis direction, the one touch line 31 interposed between the touch electrodes 30 adjacent to each other in the X-axis direction is utilized as the second line 42. The surplus of touch lines 31 overlapping with the touch electrodes 30 can be utilized, for example, to achieve multiple lines by connecting the two or more touch lines 31 to the touch electrode 30 located far from the driver 12, or for another purpose. By adopting such a configuration, the number of installed touch lines 31 is less than the number of installed source lines 27, and a difference in the number coincides with the number of second lines 42 installed. The number (one) of installed second lines 42 connected, via the TFT 50, to the touch electrodes 30 arranged along the Y-axis direction in a column is set to be less than the number (fifty) of arranged touch electrodes 30 forming a column.

As shown in FIG. 5, the second line 42 is arranged such that a main body portion thereof extending along the Y-axis direction is interposed between the touch electrodes 30 adjacent to each other in the X-axis direction, and is arranged such that the above-described main body portion does not overlap with each touch electrode 30 but overlaps with the partition opening portion 25B of the common electrode 25. Since this second line 42 is put in the reference potential by the second common signal supplied from the common signal supply line 45 and potential fluctuation is not generated in the second line 42 unlike the first line 41, a situation can be made difficult to occur that an electric field occurring between the common electrode 25 and the pixel electrode 24 becomes unstable locally due to the absence of the touch electrode 30. The second line 42 has at least two first projecting portions (projecting portions) 42A projecting from the main body portion bilaterally along the X-axis direction which is a direction crossing the extension direction of the main body portion. The two first projecting portions 42A each have a rectangular shape in plan view, and they are arranged to overlap with the two touch electrodes 30 sandwiching the second line 42 via the second interlayer insulating film 39, respectively. Regarding the TFT 50, at least two TFTs 50 are arranged to sandwich the second line 42 in the X-axis direction, and two source electrodes 50B constituting the two TFTs 50 are connected to the two first projecting portions 42A of the above-described second line 42, respectively. That is, the second common signal transmitted to one second line 42 is configured to be capable of being supplied to the two touch electrodes 30 adjacent to each other via two TFTs 50 in the X-axis direction. Thus, since the second common signal is distributed to the at least two touch electrodes 30 adjacent to each other from the second line 42 sandwiched therebetween, a good arrangement efficiency is achieved, as compared with a case where the second common signals are supplied from different second lines 42 to each touch electrode 30 via the TFT 50. Thereby, for example, a large number of installed touch lines 31 can be secured, which is preferred in terms of supplying the touch signal to the touch electrode 30. Incidentally, the two TFTs 50 sandwiching the second line 42 in the X-axis direction constitute a set of TFTs 50, and as the set of TFTs 50, two or more sets of TFTs 50 are arranged with respect to one second line 42 to be spaced from each other in the Y-axis direction (see FIG. 3).

Figure 7:
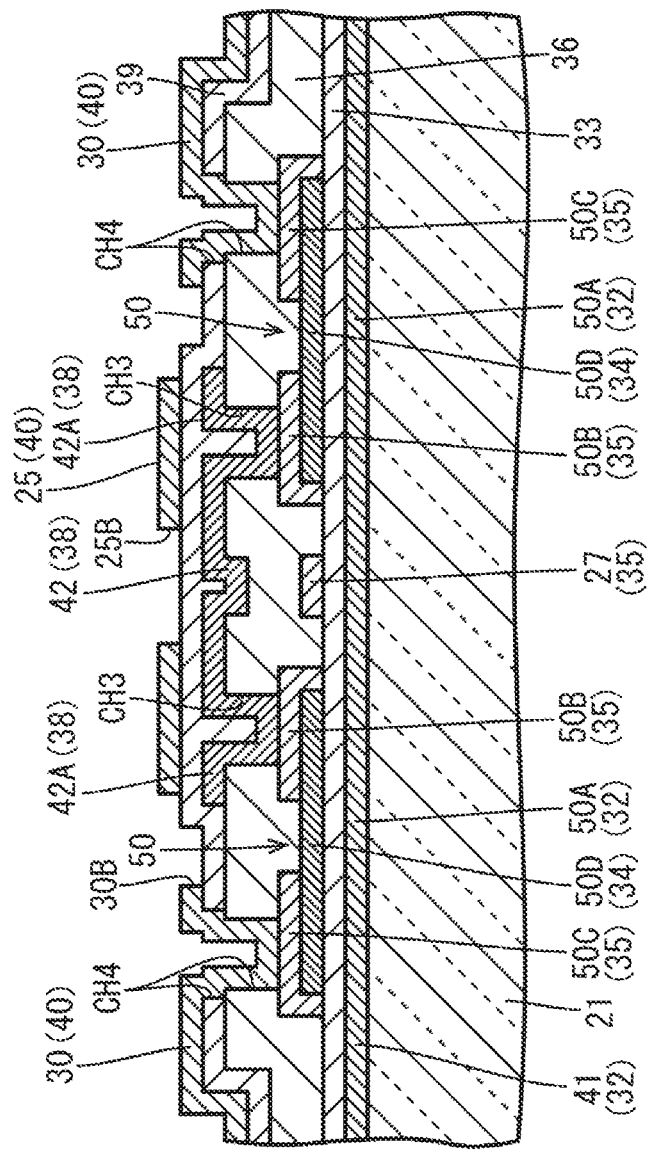
FIG. 7 is a cross-sectional view of the array substrate taken along line C-C shown in FIG. 5.

Subsequently, a specific configuration of the TFT 50 will be described with reference to FIG. 5 and FIG. 7. FIG. 7 is a cross-sectional view of a vicinity of the TFT 50 in the array substrate 21. As shown in FIG. 5 and FIG. 7, the TFT 50 is provided with a gate electrode 50A connected to the first line 41, a source electrode 50B connected to the second line 42, a drain electrode 50C connected to the touch electrode 30, and a channel portion 50D connecting the source electrode 50B and the drain electrode 50C to each other. The gate electrode 50A is composed of a portion of the first line 41 extending along the X-axis direction and it is composed of the first metal film 32. The channel portion 50D is composed of the semiconductor film 34, and it extends along the X-axis direction and arranged to overlap with the gate electrode 50A. The source electrode 50B and the drain electrode 50C are composed of the second metal film 35, and they are arranged to be spaced from each other to be overlapped on both end portions of the channel portion 50D in the X-axis direction. The first projecting portion 42A of the second line 42 composed of the third metal film 38 is arranged to overlap with the source electrode 50B of the TFT 50 and is connected to the source electrode 50B via the contact hole for a source electrode CH3 formed in an opening manner in the first interlayer insulating film 36 interposed between the first projecting portion 42A and the source electrode 50B. On the other hand, the touch electrode 30 composed of the second transparent electrode film 40 is arranged such that a portion thereof overlaps with the drain electrode 50C of the TFT 50, and is connected to the drain electrode 50C via a contact hole for a drain electrode CH4 formed in an opening manner in the first interlayer insulating film 36 and the second interlayer insulating film 39 interposed between the touch electrode 30 and the drain electrode 50C. The touch electrode 30 has an opening portion (channel overlapping opening portion) 30B in a position where the touch electrode 30 overlaps with the channel portion 50D. When the TFT 50 is in off, fluctuation of a leakage current amount between the source electrode 50B and the drain electrode 50C with a voltage fluctuation of the common electrode 25 (touch electrode 30) can be suppressed by this opening portion 30B. Two TFTs 50 sandwiching the second line 42 are arranged to form a symmetrical shape which is symmetric about the second line 42. That is, regarding the two TFTs 50 sandwiching the second line 42, their own source electrodes 50B are arranged on the second line 42 side in the X-axis direction, while their own drain electrodes 50C are arranged on the side opposite to the second line 42 in the X-axis direction. Regarding the two TFTs 50 sandwiching the second line 42, their own gate electrodes 50A are each composed of a portion of the same first line 41. Therefore, when a drive signal is transmitted to the first line 41, the two TFTs 50 sandwiching the second line 42 are driven at the same timing, and the second common signal transmitted to the second line 42 is supplied from their own source electrodes 50B to the drain electrodes 50C via the channel portions 50D. Thereby, the second common signal is supplied to the two touch electrodes 30 sandwiching the second line 42 at the same timing.

Incidentally, the second line 42 is led out to the outside of the active area AA (the non-active area NAA), and the lead-out end portion thereof is connected to the common signal supply line 45 to be supplied with the second common signal from the common signal supply line 45 (see FIG. 2). A configuration of the common signal supply line 45 will be described with reference to FIG. 2. As shown in FIG. 2, the common signal supply line 45 is composed of a stem line 45A extending along the Y-axis direction and a branch line 45B branching from the stem line 45A and extending along the X-axis direction. As the stem line 45A, two stem lines 45A are provided in each area between one of the two gate circuit portions GDM and the active area AA in the non-active area NAA. Regarding the stem line 45A, one end portion thereof in an extension direction thereof is connected to the common signal supply terminal portion 49C. As the branch line 45B, two branch lines 45B are provided to be adjacent to the active area AA so as to sandwich the active area AA from both sides thereof in the Y-axis direction in the non-active area NAA. Both end portions of the branch line 45B regarding the extension direction are connected to the two stem lines 45A, respectively. The above-described second line 42 is arranged such that both the end portions thereof in the extension direction are connected to the two branch lines 45B, respectively.

Figure 8:
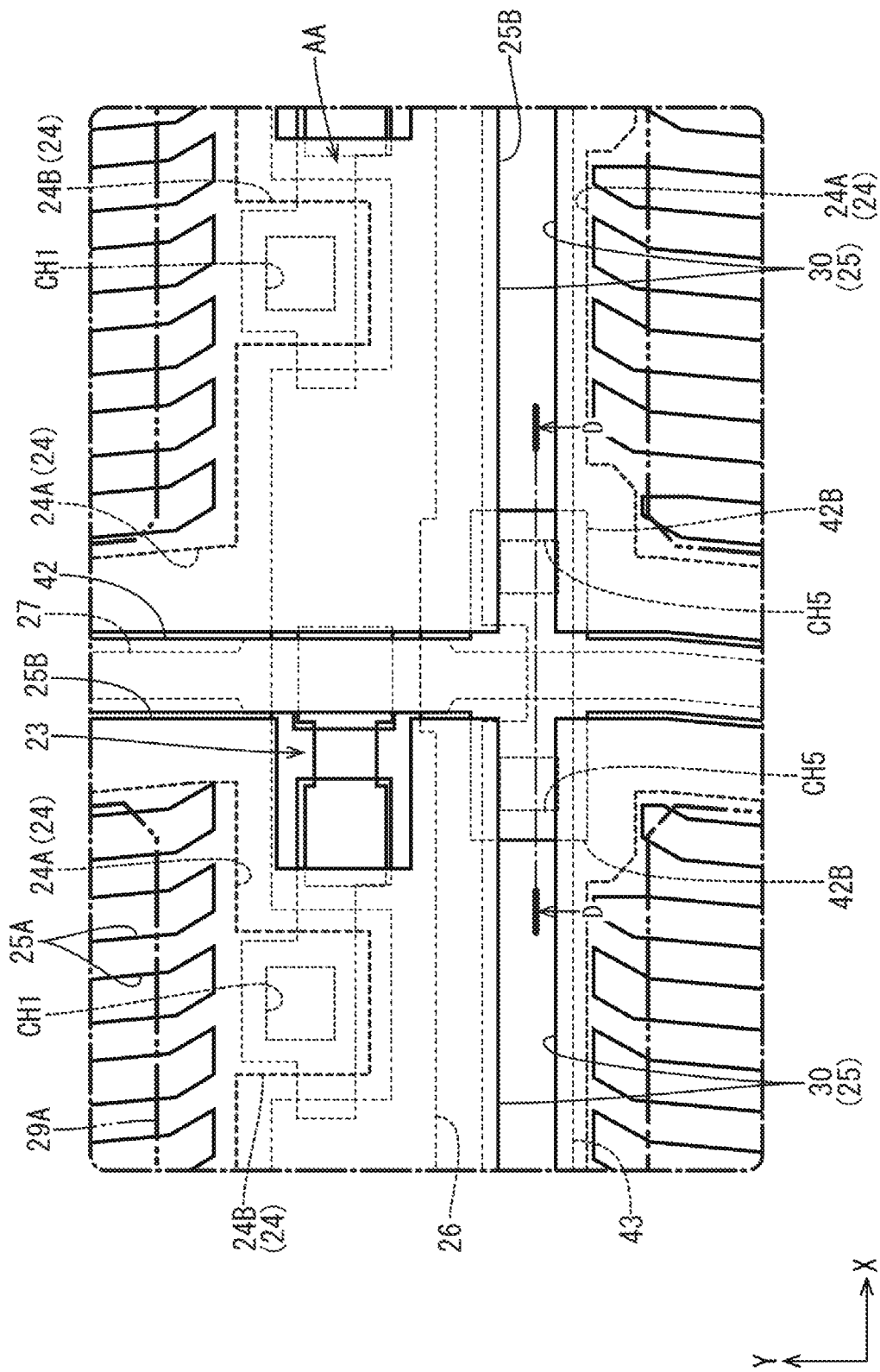
FIG. 8 is a plan view showing a vicinity of a crossing portion of a second line and a third line in the array substrate and the CF substrate configuring the liquid crystal panel.
Figure 9:
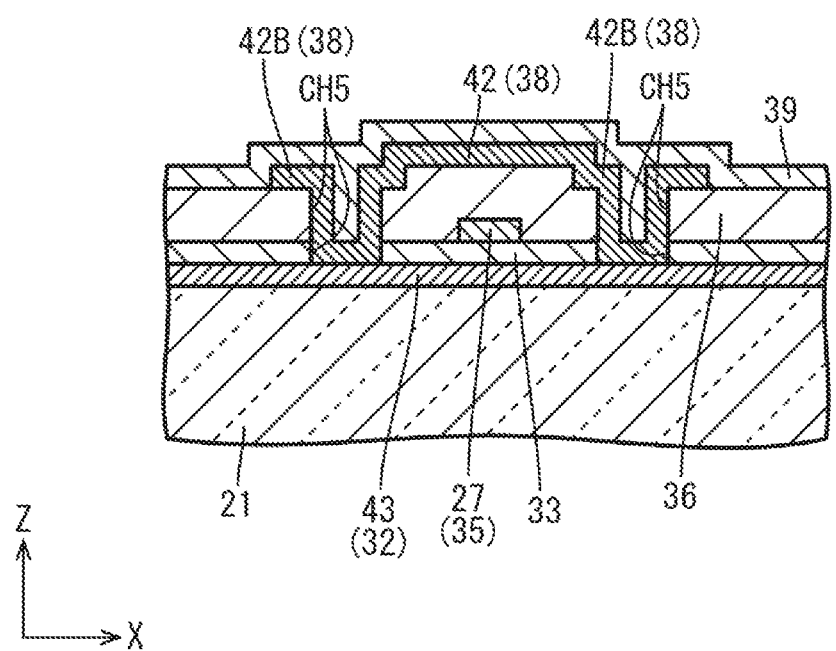
FIG. 9 is a cross-sectional view of the array substrate taken along line D-D shown in FIG. 8.

A configuration of the third line 43 will be described with reference to FIG. 8 and FIG. 9. FIG. 8 is a plan view of a vicinity of a crossing portion of the second line 42 and the third line 43. FIG. 9 is a cross-sectional view of the vicinity of the crossing portion of the second line 42 and the third line 43 in the array substrate 21. As shown in FIG. 8, the third line 43 is composed of the same first metal line 32 as the gate line 26 and the first line 41, it is spaced in the Y-axis direction from and adjacent to the gate line 26, and it extends in parallel with the gate line 26 approximately along the X-axis direction. The third line 43 is arranged to be sandwiched, in the Y-axis direction, between the gate line 26 and a group of the pixel electrodes 24 opposed to (on the lower side on FIG. 8) a group of the pixel electrodes 24 which are to be connected with the gate line 26. The third line 43 is selectively provided in an area where the first line 41 is not formed in an area between the pixel electrodes 24 arranged along the Y-axis direction. The third line 43 is arranged to be interposed between the touch electrodes 30 adjacent to each other in the Y-axis direction, and it is arranged so as not to overlap with each touch electrode 30 but to overlap with the partition opening portion 25B of the common electrode 25. Since the third line 43 is put in the reference potential by the second common signal supplied from the common signal supply line 45 and potential fluctuation does not occur unlike the first line 41, a situation can be made difficult to occur that an electric field occurring between the common electrode 25 and the pixel electrode 24 becomes unstable locally due to the absence of the touch electrode 30. Incidentally, the third line 43 is led out to the outside of the active area AA (the non-active area NAA), and the led-out end portion thereof is connected to the common signal supply line 45 to be supplied with the second common signal from the common signal supply line 45 (see FIG. 2). Specifically, the third line 43 is connected to an intermediate portion in the extension direction (a portion except for both end portions) of the stem line 45A constituting the common signal supply line 45.

In addition, as shown in FIG. 9, the third line 43 is connected to the second line 42 crossing the third line 43 in the active area AA. The second line 42 has at least two second projecting portions 42B projecting from an area of a main body portion thereof crossing the third line 43 bilaterally along the X-axis direction which is a direction crossing the extension direction of the second line 42. The two second projecting portions 42B are formed in a rectangular shape in plan view, and they are each arranged to overlap with the third line 43 crossing the second line 42 via the first interlayer insulating film 36 and the gate insulating film 33. The second projecting portion 42B of the second line 42 composed of the third metal film 38 and the third line 43 composed of the first metal film 32 are connected to each other in an overlapping area with each other via a contact hole for a third line CH5 formed in an opening manner in the first interlayer insulating film 36 and the gate insulating film 33 interposed therebetween. By adopting such a configuration, since the second line 42 and the third line 43 are connected (short-circuited) to each other via the contact holes for a third line CH5 and they are each supplied with the second common signal from the common signal supply line 45, a voltage drop becomes unlikely to occur in the second common signal supplied to the touch electrode 30 due to line resistances of the second line 42 and the third line 43. Particularly, this becomes suitable as enlargement of the liquid crystal display device 10 progresses.

Figure 10:
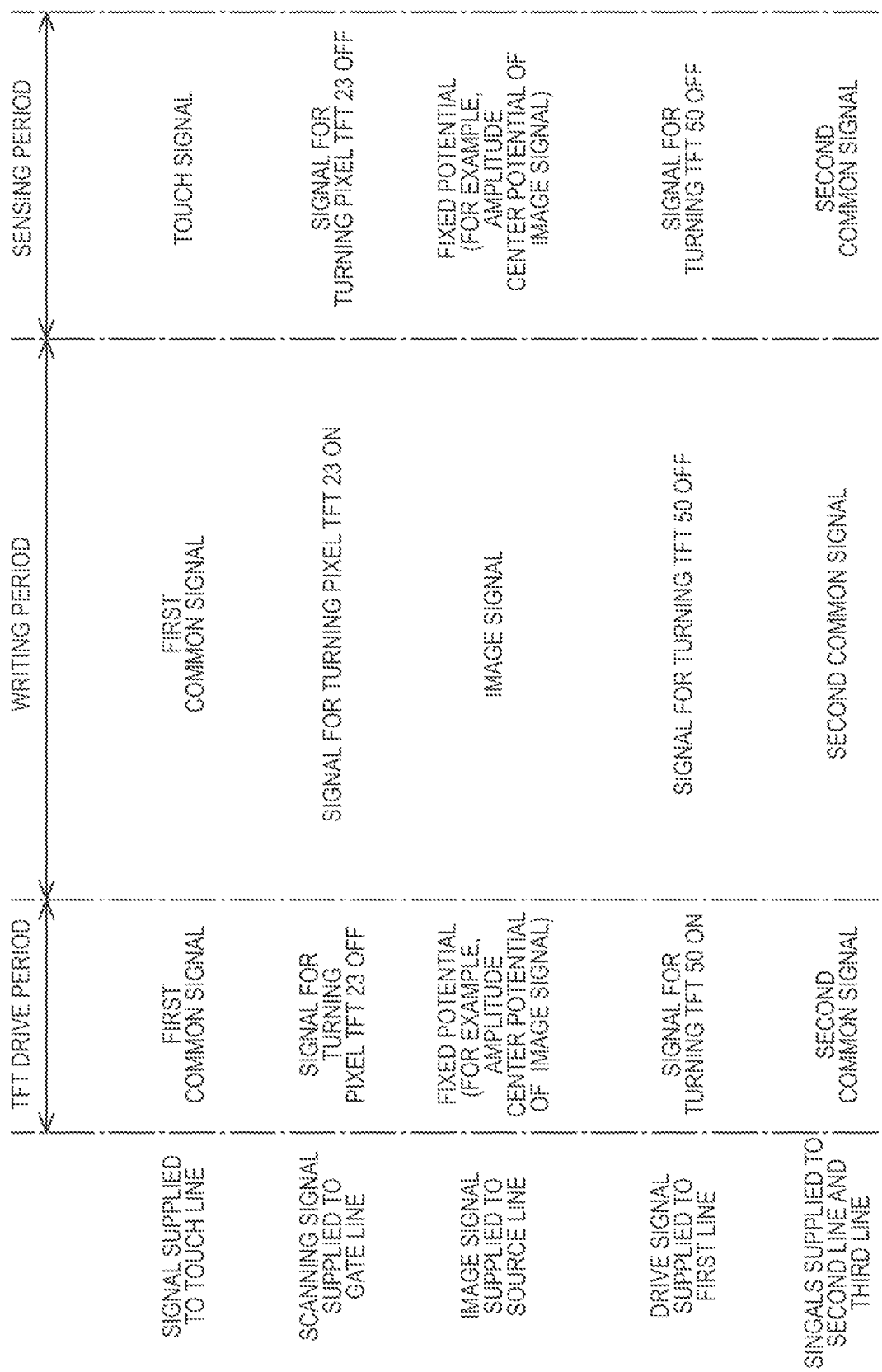
FIG. 10 is a timing chart showing a driving method for performing a TFT driving period at a timing between a sensing period and a wiring period.
Figure 11:
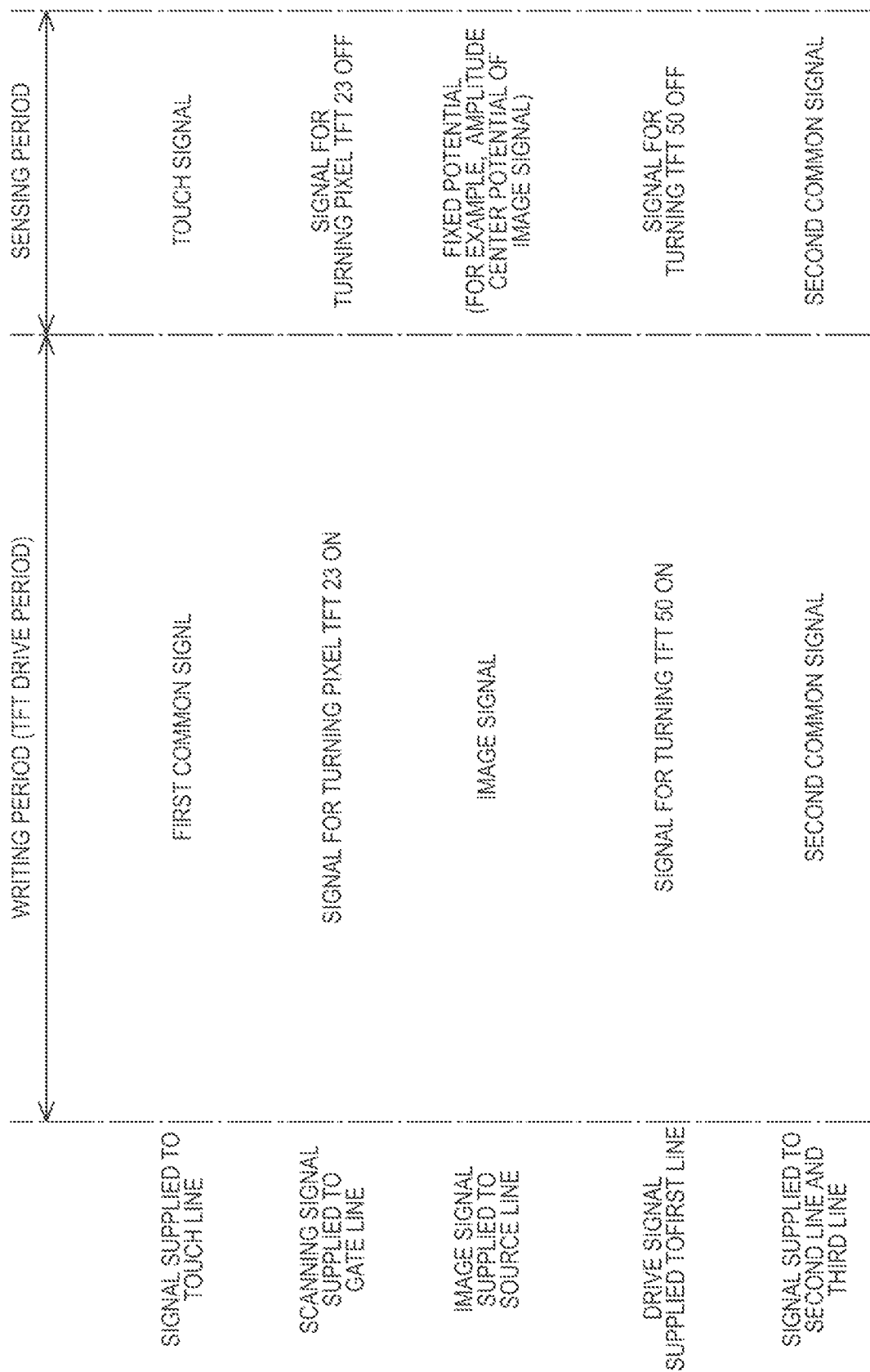
FIG. 11 is a timing chart showing a driving method for performing the TFT driving period during the writing period.

Subsequently, a technique for driving the TFT 50 will be described with reference to FIG. 10 and FIG. 11. FIG. 10 and FIG. 11 are diagrams showing a relationship in the liquid crystal panel 11 between a writing period for driving each pixel TFT 23 and supplying an image signal to each pixel electrode 24, a sensing period for performing touch detection (position detection period), and a TFT drive period for driving the TFT 50. The technique for driving the TFT 50 shown in FIG. 10 will be first described. According to FIG. 10, the TFT drive period is performed at a timing after the sensing period is performed and before the writing period is performed, namely, at a timing between the sensing period and the writing period. The terminal portion for a touch line 48B supplies the first common signal in the writing period and the TFT drive period and the touch signal in the sensing period, respectively, to the touch line 31 in a time-divisional manner. In synchronization with this, in the writing period, the gate circuit portion GDM and the terminal portion for a source line 48A supply a scanning signal (a signal for turning the pixel TFT 23 on) and an image signal to the gate line 26 and the source line 27, respectively, but in the other periods (the sensing period and the TFT period), the gate circuit portion GDM does not supply the image signal to the source line 27 but supplies a fixed potential which is, for example, an amplitude center potential of the image signal to the source line 27, and the terminal portion for a source line 48A supplies a signal for turning the pixel TFT 23 off to the gate lines 26. On the other hand, the drive signal supply line 44 supplies a drive signal (a signal for turning the TFT 50 on) to the first line 41 in the TFT drive period, and supplies a signal for turning the TFT 50 off to the first line 41 in the other periods (the writing period and the sensing period). Further, the common signal supply line 45 supplies the second common signals to the second line 42 and the third line 43 in any period (the TFT drive period, the sensing period, and the writing period). Thus, the drive signal supply line 44 supplies the drive signal to the first line 41 at a timing before the scanning signal for turning the pixel TFT 23 on is transmitted to the gate line 26, and it stops supplying the drive signal to the first line 41 while the scanning signal is being transmitted to the gate line 26. That is, a signal supplied to the first line 41 does not fluctuate in the writing period. Here, if a technique where the TFT drive period is included in the writing period is adopted, a pixel electrode 24 where the potential of the first line 41 adjacent to the pixel electrode 24 when the pixel TFT 23 is on and the potential thereof when the pixel TFT 23 is off are different from each other is eventually included, a potential difference between the pixel electrode 24 adjacent to the first line 41 and another pixel electrode 24 occurs due to a parasitic capacitance occurring between the first line 41 and the pixel electrode 24 adjacent to the first line 41, which may result in occurrence of streaky display unevenness along the extension direction of the first line 41. Regarding this point, by adopting the technique where the TFT drive period is performed before the writing period, as described above, since the TFT 50 is selectively driven at a timing before the pixel TFT 23 is driven, a potential difference of the pixel electrode 24 due to the parasitic capacitance occurring between the first line 41 and the pixel electrode 24 adjacent to the first line 41 is reduced. Thereby, the streaky display unevenness along the extension direction of the first line 41 is difficult to occur.

Subsequently, a technique for driving the TFT 50 shown in FIG. 11 will be described. According to FIG. 11, the TFT drive period is performed at a timing where the writing period is performed. That is, the TFT drive period and the writing period coincide with each other. The terminal portion for a touchline 48B supplies the touch line 31 with the first common signal in the writing period and the touch signal in the sensing period, respectively, in a time-divisional manner. In synchronization with this, in the writing period, the gate circuit portion GDM and the terminal portion for a source line 48A supply the scanning signal (the signal for turning the pixel TFT 23 on) and the image signal to the gate line 26 and the source line 27, respectively, but, in the sensing period, the gate circuit portion GDM stops supplying the image signal, but supplies a fixed potential which is, for example, an amplitude center potential of the image signal to the source line 27 and the terminal portion for a source line 48 supplies a signal for turning the pixel TFT 23 off to the gate lines 26. On the other hand, the drive signal supply line 44 supplies the first line 41 with a drive signal (a signal for turning the TFT 50 on) in the writing period which is the TFT drive period, and supplies a signal for turning the TFT 50 off in the sensing period. Further, the common signal supply line 45 supplies the second common signal to the second line 42 and the third line 43 in both of the writing period which is the TFT drive period and the sensing period. Thus, the drive signal supply line 44 and the common signal supply line 45 continue to supply the drive signal and the second common signal to the first line 41, the second line 42 and the third line 43, respectively, while the scanning signal is being transmitted to the gate line 26. By adopting such a configuration, the second common signal is constantly supplied to the touch electrode 30 while the pixel TFT 23 is being driven, which is consequently further suitable in terms of retaining two or more touch electrodes 30 at the reference potential.

As described above, the liquid crystal display device (the display device having a position input function) 10 of the present embodiment is provided with the pixel electrode 24, the common electrode 25 arranged to at least partially overlap with the pixel electrode 24 via the second interlayer insulating film (insulating film) 39, the two or more touch electrodes (position detection electrodes) 30 obtained by diving the common electrode 25, the two or more touch electrodes 30 forming an electrostatic capacitance between the touch electrodes 30 and a finger which is a position input body for performing position input, and detecting an input position by the finger which is a position input body, the touch line (position detection line) 31 connected to the touch electrode 30 to supply the touch signal (position detection signal) and the first common signal (common signal) for bringing the touch electrode 30 into the reference potential in a time-divisional manner, the first line 41 to which the drive signal is transmitted, the second line 42 extending to cross the first line 41, and the TFT (switching element) 50 connected to the first line 41, the second line 42 and the touch electrode 30 and connecting the second line 42 to the touch electrode 30 when being driven by the drive signal transmitted to the first line 41.

By adopting such a configuration, a potential difference based upon a voltage supplied to the pixel electrode 24 can occur between the pixel electrode 24 and the common electrode 25 having at least a portion overlapping with the pixel electrode 24 via the second interlayer insulating film 39, and an image is displayed by utilizing the potential difference. On the other hand, the two or more touch electrodes 30 obtained by dividing the common electrode 25 form an electrostatic capacitance between the touch electrodes 30 and the finger which is a position input body for performing position input, and can detect an input position by the finger which is a position input body. Since the touch line 31 supplies the touch signal and the first common signal for bringing the touch electrode 30 into the reference potential to the touch electrode 30 connected to the touch line 31 in a time-divisional manner, the above-described position detection function and image display function can be performed.

By the way, as described above, the touch signal and the first common signal are supplied to the touch electrode 30 in a time-divisional manner, but a concern is the occurrence of a potential difference between the two or more touch electrodes 30 at the timing of switching between these signals. That is, depending on the arrangement of the touch electrodes 30, or the like, a voltage drop may occur in the first common signal to be supplied to the touch electrode 30 due to the line resistance of the touch line 31 connected to the touch electrode 30 and a touch electrode 30 which fails to reach the predetermined reference potential may occur. However, since the TFT 50 can connect the second line 42 to the touch electrode 30 when the TFT 50 is driven by the drive signal transmitted to the first line 41, for example, by configuring the second line 42 to be supplied with the second common signal, the common signal is supplied from the second line 42 to the touch electrode 30 via the TFT 50. Therefore, even if the voltage drop occurs in the first common signal supplied from the touch line 31 to the touch electrode 30, the touch electrode 30 can be charged to the predetermined reference potential, and the potential difference becomes difficult to occur between the two or more touch electrodes 30. In addition, for example, by connecting the second line 42 to the two or more touch electrodes 30 via the TFT 50, the two or more touch electrodes 30 can be short-circuited by the second line 42, so that the potential difference becomes difficult to occur between the two or more touch electrodes 30. Further, since the configuration where the touch signal and the first common signal are supplied to the touch electrodes 30 obtained by diving the common electrode 25 in a time-divisional manner is assumed, it is easy to retain the common electrode 25 at the reference potential during displaying, as compared with a case where the image signal for display and the writing signal for detection are supplied to the pixel electrode 24 in a time-divisional manner like a conventional case, and display integrity is difficult to lower. As described above, good display integrity is achieved.

Further, at least one of the common signal supply line (common signal supply portion) 45 for supplying the second common signal (common signal) and the third line 43 extending in parallel with the first line 41 and connected to the second line 42 is connected to the common signal supply line 45. By adopting such a configuration, when the second common signal is supplied from the common signal supply line 45 to at least one of the second line 42 and the third line 43, the second common signal is transmitted to both the second line 42 and the third line 43 connected to each other. The second common signal is supplied from the second line 42 to the touch electrode 30 with the driving of the TFT 50, which is consequently suitable in terms of retaining the touch electrode 30 at the reference potential.

In addition, the second line 42 and the third line 43 are each connected to the common signal supply lines 45. By adopting such a configuration, the second common signal is supplied from the common signal supply lines 45 to both the second line 42 and the third line 43, a voltage drop due to the line resistance of the second line 42 and the third line 43 is difficult to occur in the second common signal supplied to the touch electrode 30. Particularly, this becomes suitable as enlargement of the liquid crystal display device 10 progresses.

Further, the third line 43 is arranged between the touch electrodes 30 adjacent to each other in the extension direction of the second line 42. An electric field occurring between the common electrode 25 which is the touch electrode 30 and the pixel electrode 24 may become unstable locally between the touch electrodes 30 adjacent to each other in the extension direction of the second line 42. However, since the third line 43 arranged between the touch electrodes 30 adjacent to each other in the extension direction of the second line 42 is connected to the second line 42 and brought into the reference potential by the second common signal supplied from the common signal supply line 45, a situation can be made difficult to occur that an electric field occurring between the common electrode 25 and the pixel electrode 24 becomes unstable locally.

Furthermore, the second line 42 is arranged between the touch electrodes 30 adjacent to each other in the extension direction of the first line 41. An electric field occurring between the common electrode 25 which is the touch electrode 30 and the pixel electrode 24 may become unstable locally between the touch electrodes 30 adjacent to each other in the extension direction of the first line 41. However, since the second line 42 arranged between the touch electrodes 30 adjacent to each other in the extension direction of the first line 41 is connected to the third line 43 and brought into the reference potential by the second common signal supplied from the common signal supply line 45, a situation can be made difficult to occur that an electric field occurring between the common electrode 25 and the pixel electrode 24 becomes unstable locally.

Further, as the TFT 50, at least two TFTs 50 are provided to be connected to the first line 41, the second line 42, and at least two touch electrodes 30 sandwiching the second line 42, respectively. By adopting such a configuration, when the drive signal is transmitted to the first line 41, the at least two TFTs 50 connected to the first line 41 are driven. Thereupon, the second common signal transmitted to the second line 42 connected to the at least two TFTs 50 is supplied to each of the at least two touch electrodes 30 sandwiching the second line 42. In this manner, the second common signal is distributed to the at least two touch electrodes 30 adjacent to each other from the second line 42 sandwiched therebetween, a good arrangement efficiency is achieved, as compared with a case where the second common signal is supplied from different second lines 42 to each touch electrode 30 via the TFT 50. Thereby, for example, a large number of installed touch lines 31 can be secured, which is preferred in terms of supplying the touch signal to the touch electrode 30.

In addition, the liquid crystal display device 10 includes the gate line (scanning line) 26 extending in parallel with the first line 41 to transmit a scanning signal, the source line (signal line) 27 extending in parallel with the second line 42 to transmit an image signal, the pixel TFT (pixel switching element) 23 connected to the gate line 26, the source line 27 and the pixel electrode 24 and driven by the scanning signal transmitted to the gate line 26 to supply the pixel electrode 24 with an image signal transmitted to the source line 27, the gate circuit portion (scanning signal supply portion) GDM connected to the gate line 26 to supply the scanning signal to the gate line 26, and the drive signal supply line (drive signal supply portion) 44 arranged to be adjacent to the gate circuit portion GDM, extending in parallel with the second line 42, and connected to the first line 41 to supply the drive signal to the first line 41. By adopting such a configuration, when the pixel TFT 23 is driven by the scanning signal supplied from the gate circuit portion GDM to the gate line 26, the pixel TFT 23 can supply the image signal transmitted to the source line 27 to the pixel electrode 24 and can charge the pixel electrode 24 to the predetermined potential. The TFT 50 is driven based upon the drive signal supplied from the drive signal supply line 44 to the first line 41. Since the drive signal supply line 44 is arranged to be adjacent to the gate circuit portion GDM and extends in parallel with the second line 42, an arrangement space therefor can be reduced, and when two or more the first lines 41 are arranged along the extension direction of the second line 42, the drive signal can be supplied collectively to the two or more first lines 41, which is suitable.

Further, the liquid crystal display device 10 includes the gate line 26 extending in parallel with the first line 41 to transmit the scanning signal, the source line 27 extending in parallel with the second line 42 to transmit the image signal, the pixel TFT 23 connected to the gate line 26, the source line 27 and the pixel electrode 24 and driven by a scanning signal transmitted to the gate line 26 to supply the pixel electrode 24 with an image signal transmitted to the source line 27, and the drive signal supply line 44 connected to the first line 41 to supply the drive signal to the first line 41, and the drive signal supply line 44 supplies the drive signal to the first line 41 at a timing before the scanning signal is transmitted to the gate line 26 and the drive signal supply line 44 stops supplying the drive signal to the first line 41 while the scanning signal is being transmitted to the gate line 26. By adopting such a configuration, when the pixel TFT 23 is driven by the scanning signal transmitted to the gate line 26, the pixel TFT 23 can supply the image signal transmitted to the source line 27 to the pixel electrode 24 and can charge the pixel electrode 24 to the predetermined potential. The TFT 50 is driven based upon the drive signal supplied from the drive signal supply line 44 to the first line 41, and selectively supplies the second common signal to the touch electrodes 30 at a timing before the pixel TFT 23 is driven. Here, if a pixel electrode 24 where the potential of the first line 41 adjacent to the pixel electrode 24 when the pixel TFT 23 is on and potential thereof when the pixel TFT 23 is off are different from each other is included, a potential difference between the pixel electrode 24 adjacent to the first line 41 and another pixel electrode 24 occurs due to a parasitic capacitance occurring between the first line 41 and the pixel electrode 24 adjacent to the first line 41, which may result in occurrence of streaky display unevenness along the extension direction of the first line 41. However, as described above, since the TFTs 50 are selectively driven at the timing before the pixel TFT 23 is driven, so that the potential difference of the pixel electrode 24 due to the parasitic capacitance occurring between the first line 41 and the pixel electrode 24 adjacent thereto is reduced. Thereby, the streaky display unevenness along the extension direction of the first line 41 becomes difficult to occur.

In addition, the liquid crystal display device 10 includes the gate line 26 extending in parallel with the first line 41 to transmit the scanning signal, the source line 27 extending in parallel with the second line 42 to transmit the image signal, the pixel TFT 23 connected to the gate line 26, the source line 27 and the pixel electrode 24 and driven by a scanning signal transmitted to the gate line 26 to supply the pixel electrode 24 with an image signal transmitted to the source line 27, and the drive signal supply line 44 connected to the first line 41 to supply the drive signal to the first line 41, and the drive signal supply line 44 continues to supply the drive signal to the first line 41 while the scanning signal is being transmitted to the gate line 26. By adopting such a configuration, when the pixel TFT 23 is driven by the scanning signal transmitted to the gate line 26, the pixel TFT can supply the pixel electrode 24 with the image signal transmitted to the source line 27 and can charge the pixel electrode 24 to the predetermined potential. The TFT 50 is driven based upon the drive signal supplied from the drive signal supply line 44 to the first line 41, and always supplies the second common signal to the touch electrode 30 while the pixel TFT 23 is being driven. This is suitable in terms of retaining two or more touch electrodes 30 at the reference potential.

Second Embodiment

A second embodiment will be described with reference to FIG. 12 to FIG. 15. In this second embodiment, modified configurations of a first line 141, a second line 142 and a third line 143, and the like, are shown. Incidentally, redundant descriptions of a configuration, an action and an effect similar to those of the first embodiment will be omitted.

Figure 12:
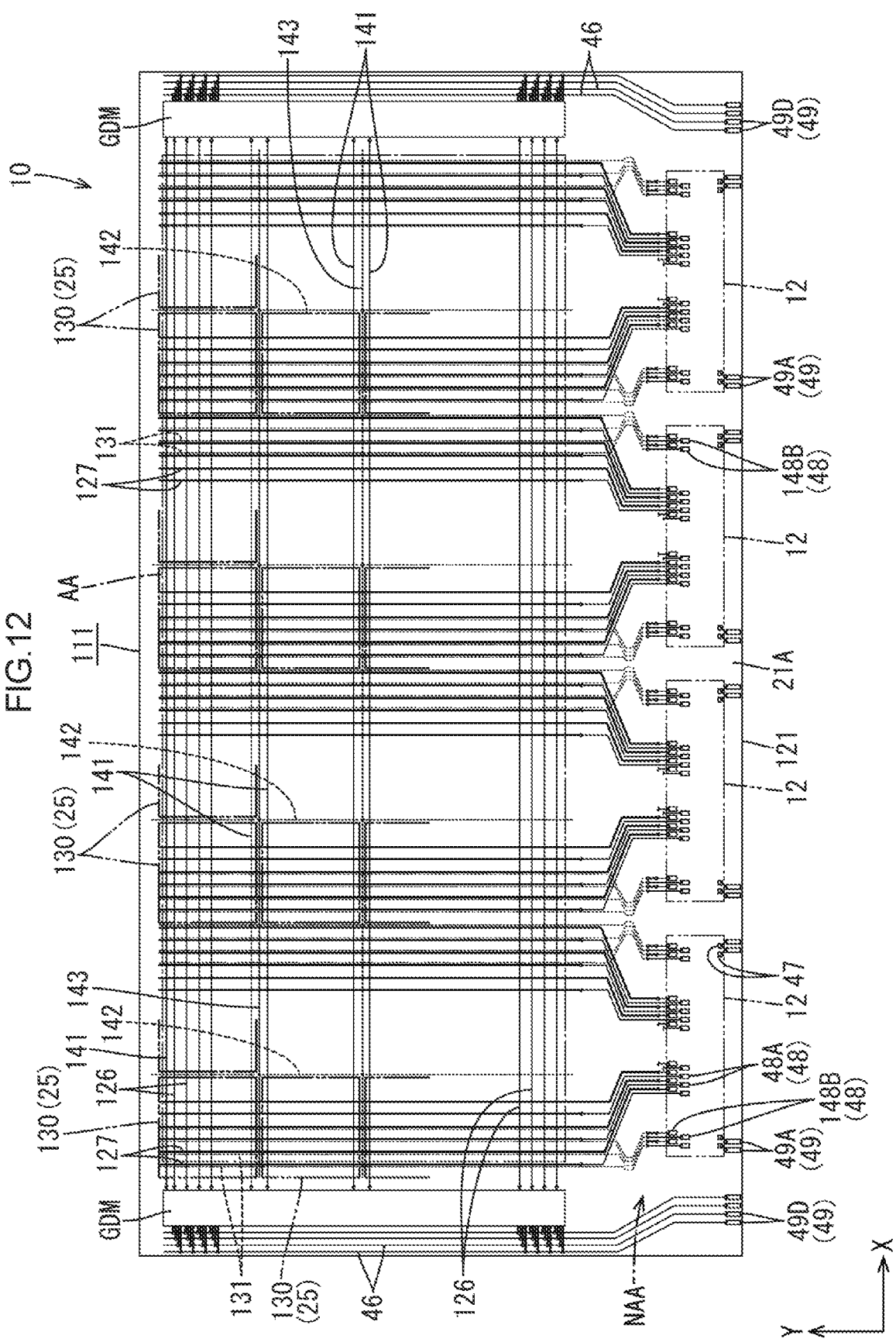
FIG. 12 is a plan view showing a touch electrode, a touch line, a gate line, a source line, and the like, in a liquid crystal panel according to a second embodiment.
Figure 13:
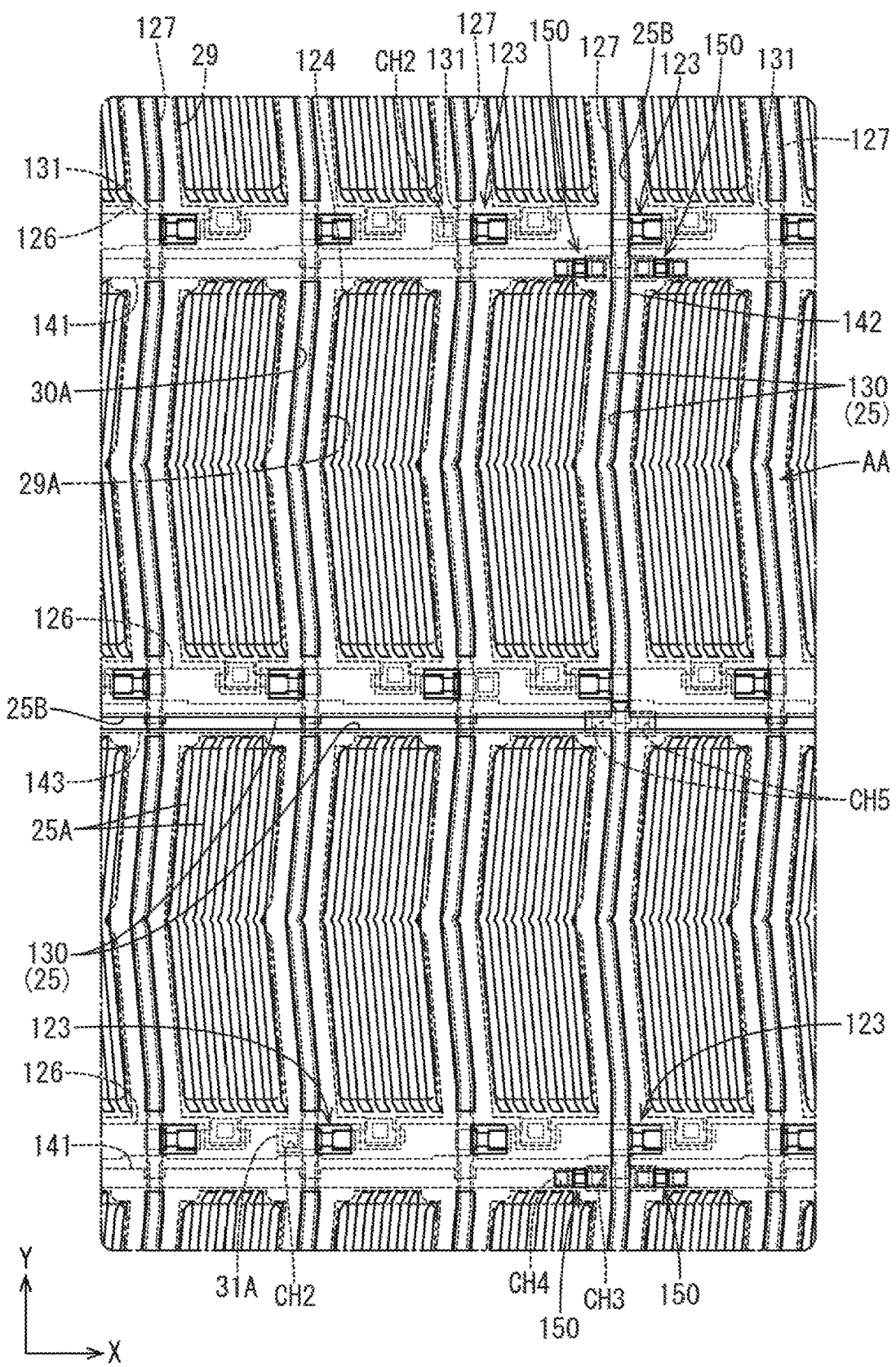
FIG. 13 is a plan view showing a pixel array in the liquid crystal panel.

As shown in FIG. 12 and FIG. 13, an array substrate 121 according to the present embodiment has a configuration where neither the drive signal supply line 44 nor the common signal supply line 45 (see FIG. 2) described in the above-described first embodiment are provided. Accordingly, the second line 142 and the third line 143 according to the present embodiment are connected to each other, but not supplied with the common signal. Incidentally, regarding the second line 142 extending along the Y-axis direction and the third line 143 extending along the X-axis direction, two or more second lines 142 and two or more third lines 143 are each arranged to be spaced from one another along a direction orthogonal to (crossing) their respective extension directions. On the other hand, the first line 141 is connected to the gate circuit portion (signal supply portion) GDM to be capable of being supplied with the drive signal from the gate circuit portion GDM. Specifically, the two or more first lines 141 arranged to be spaced from one another in the Y-axis direction are each arranged to be sandwiched by gate lines 126 regarding the Y-axis direction. The two or more first lines 141 together with the two or more gate lines 126 are connected to a shift register circuit provided in the gate circuit portion GDM, thereby being scanned sequentially from an upper end side (one end) toward a lower end side (the other end) shown in FIG. 12 and FIG. 13 in the Y-axis direction. Therefore, when the drive signal is supplied from the gate circuit portion GDM to the first lines 141, the two or more TFTs 150 connected to the first lines 141 are driven. Thereupon, the second line 142 is connected to at least two touch electrodes 130 sandwiching the second line 142. At this time, the at least two touch electrodes 130 sandwiching the second line 142 are short-circuited by the second line 142 so that they are retained at the same potential. Accordingly, a potential difference becomes difficult to occur between the two or more touch electrodes 130 brought into the reference potential by the common signals supplied from the touch lines 131. According to such a configuration, it is unnecessary to install a configuration (the common signal supply line 45 described in the above-described first embodiment) for supplying the common signal to the second lines 142, which is consequently suitable in terms of slimming the bezel configuration.

In addition, as shown in FIG. 12 and FIG. 13, since the two or more second lines 142 arranged to be spaced from one another in the X-axis direction (the extension direction of the first line 141) are connected with the third lines 143 extending along the X-axis direction, when the drive signal is transmitted to the first lines 141 and at least couple of TFTs 150 are driven, sets of at least two touch electrodes 130 short-circuited by the two or more second lines 142, respectively, are short-circuited to each other by the third lines 143 to be brought into the same potential. Thereby, a situation is made difficult to occur that a potential difference between the two or more touch electrodes 130 arranged along the X-axis direction to form a row occurs. Furthermore, since the first line 141 is configured to be connected to the gate circuit portion GDM supplying the scanning signal to the gate lines 126 to be supplied with the drive signal, a space for arranging the drive signal supply line 44 can be eliminated since the drive signal supply line 44 is unnecessary, as compared with the configuration where the drive signal supply line 44 is installed separately from the gate circuit portion GDM like the first embodiment. This is further suitable in terms of slimming the bezel configuration.

Figure 14:
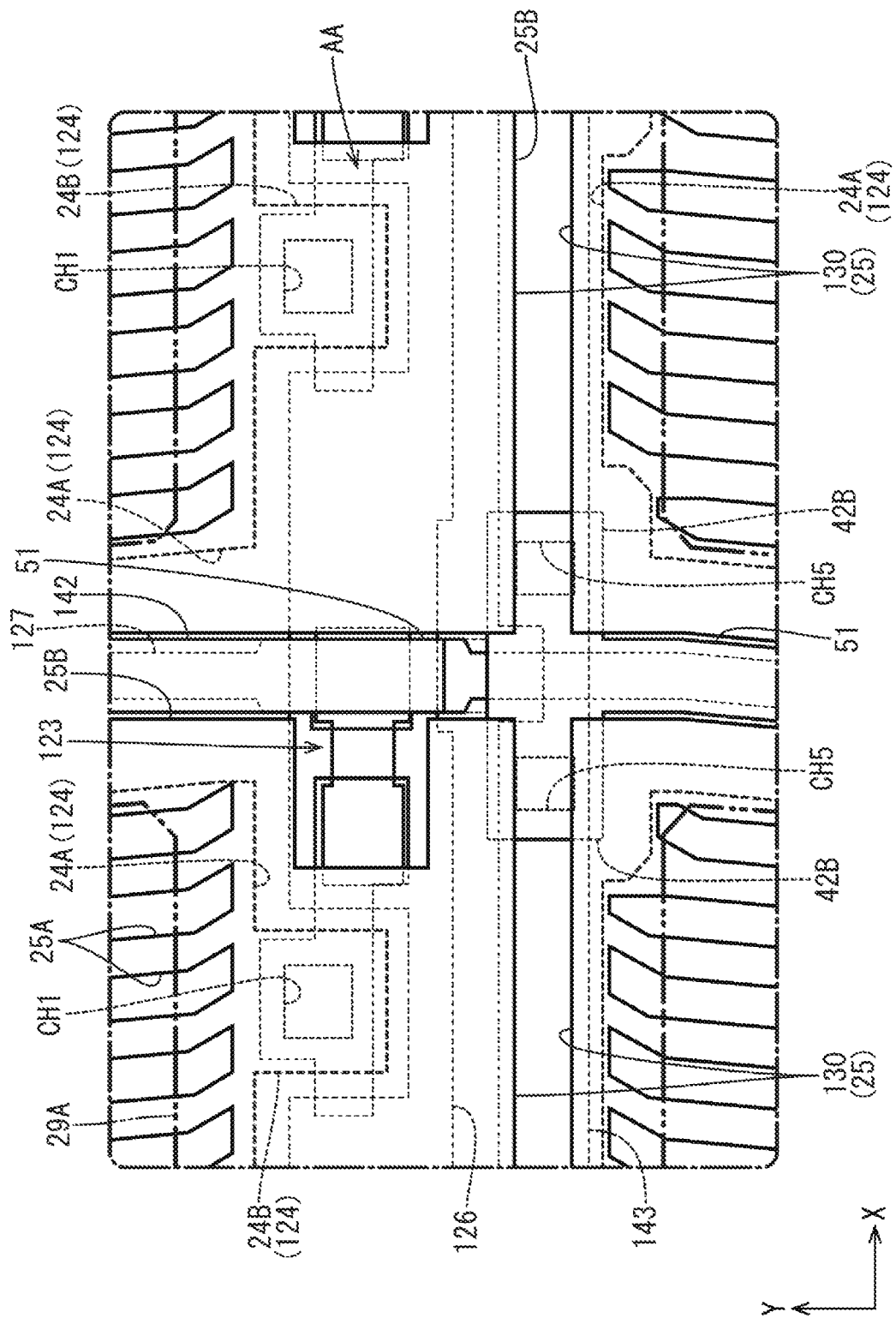
FIG. 14 is a plan view showing a vicinity of a crossing portion of a second line and a third line in an array substrate and a CF substrate configuring the liquid crystal panel.

As shown in FIG. 13 and FIG. 14, the second line 142 is divided into two or more divisional second lines 51 connected to the different third lines 143. Specifically, the number of divided second lines 142, namely, the number of divisional second lines 51 arranged in the Y-axis direction coincides with the number of the touch electrodes 130 installed in the Y-axis direction. That is, the second line 142 is divided such that the divisional second lines 51 are individually connected to the two or more touch electrodes 130 arranged along the Y-axis direction via the TFT 150. Therefore, a lengthwise dimension of the divisional second line 51 in the Y-axis direction approximates a lengthwise dimension of the touch electrode 130 in the same direction. A division position of the second line 142, namely, an end portion of the divisional second line 51 substantially coincides with a portion connected with the third line 143. The two or more divisional second lines 51 are connected to the different third lines 143, respectively, so that the two or more touch electrodes 130 arranged along the X-axis direction to form a row can be each retained at the same potential. The number of overlaps of the two or more divisional second lines 51 with the other lines (the first lines 141, the gate lines 126, and the like) is reduced down to about 1/the number of divisions of the second line 142, as compared with the number of overlaps of the second line 42 with the other lines in a case where the second line 42 is not divided like the above-described first embodiment. Thereby, a parasitic capacitance occurring between the other lines and each divisional second line 51 can be reduced. In addition, a parasitic capacitance occurring via the second line 142 and the third line 143 between one of the two or more touch electrodes 130 arranged in a row along the X-axis direction and the two or more touch electrodes 130 in another row while the touch signal is being supplied to the two or more touch electrodes 130 is also reduced by diving the second line 142 into two or more divisional second lines 51. Therefore, improvement in display integrity and improvement in touch accuracy can be achieved.

Figure 15:
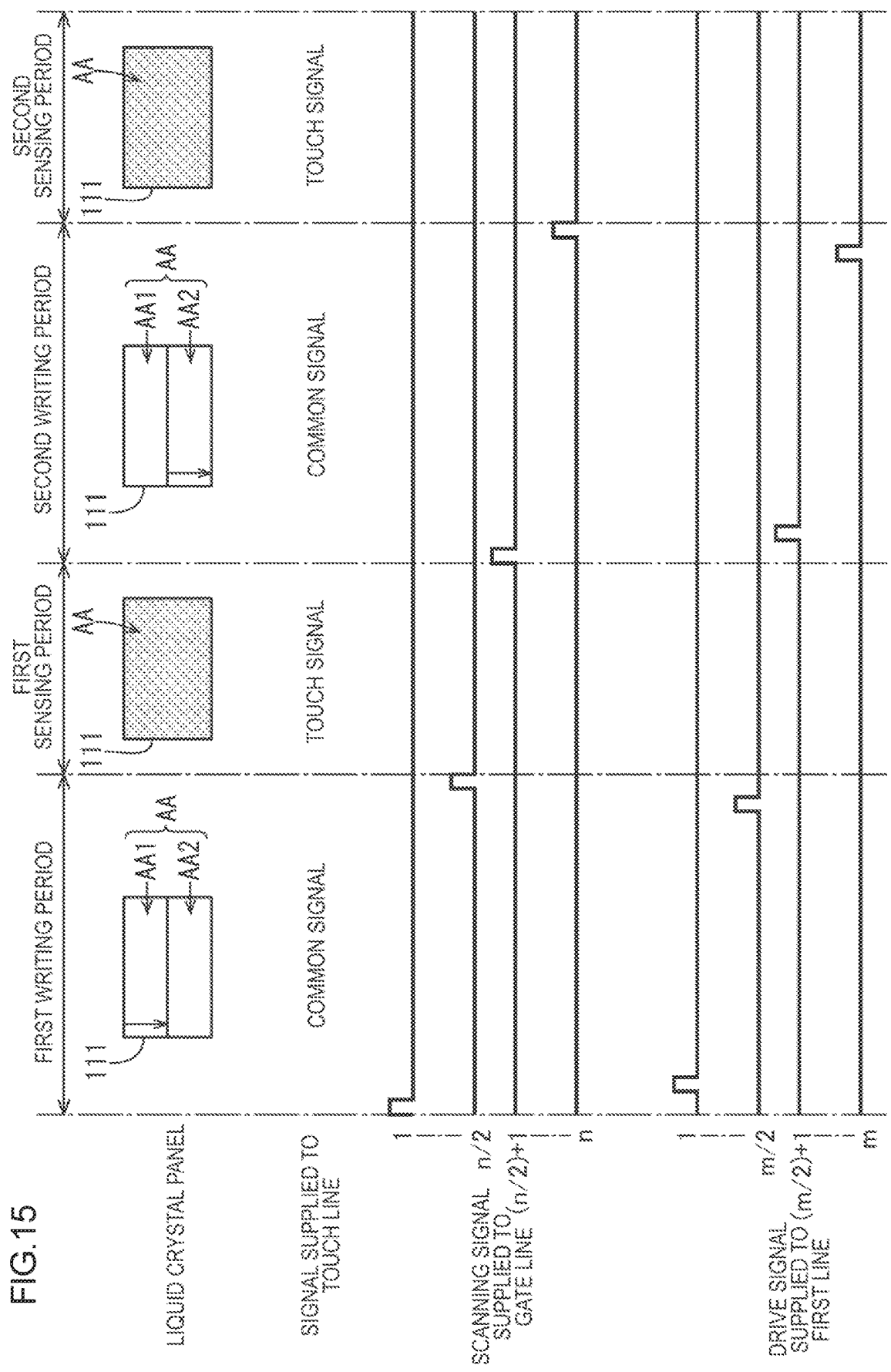
FIG. 15 is a timing chart showing a driving method for dividing a one-frame writing period into a first writing period and a second writing period.

Then, a technique for driving the TFT 150 will be described with reference to FIG. 15. FIG. 15 is a diagram showing a relationship between a first writing period and a second writing period for displaying an image, and a first sensing period (first position detection period) and a second sensing period (second position detection period) for performing touch detection, on a liquid crystal panel 111. As shown in FIG. 15, the present embodiment is configured such that writing of an image is performed separately in a first active area AA1 on the upper side in FIG. 15 and in a second active area AA2 on the lower side in FIG. 15 obtained by dividing the active area AA of the liquid crystal panel 111. That is, one frame writing period is divided into the first writing period and the second writing period. Specifically, the gate circuit portion GDM supplies scanning signals to the two or more gate lines 126 provided in the first active area AA1 to drive the pixel TFTs 123 provided in the first active area AA1 sequentially in the first writing period, and the gate circuit portion GDM supplies scanning signals to the two or more gate lines 126 provided in the second active area AA2 to drive the pixel TFT 123 provided in the second active area AA2 sequentially in the second writing period. Incidentally, when the total number of gate lines 126 provided in the active area AA is expressed as "n", the gate line 126 provided in a scanning start position is expressed as "1st gate line 126", and the gate line 126 provided in a scanning termination position is expressed as "nth gate line 126", the 1st to the (n/2)th gate lines 126 provided in the first active area AA1 are scanned in the first writing period, and the ((n/2)+1)th to the nth gate lines 126 provided in the second active area AA2 are scanned in the second writing period. Incidentally, the "n" is a natural number.

On the other hand, as shown in FIG. 15, the gate circuit portions GDM supply the drive signals to the two or more first lines 141 provided in the first active area AA1 to drive the TFTs 150 provided in the first active area AA1 sequentially in the first writing period, and the gate circuit portions GDM supply the drive signals to the two or more first lines 141 provided in the second active area AA2 to drive the TFTs 150 provided in the second active area AA2 sequentially in the second writing period. Incidentally, when the total number of first lines 141 provided in the active area AA is expressed as "m", the first line 141 closest to the scanning start position is expressed "1st first line 141", and the first line 141 closest to a scanning termination position is expressed as "mth first line 141", the 1st to the (m/2)th first lines 141 provided in the first active area AA1 are scanned in the first writing period, and the ((m/2)+1)th to the mth first lines 141 provided in the second active area AA2 are scanned in the second writing period. Incidentally, the "m" is a natural number. For example, the "m" is set at twice the number of touch electrodes 130 arranged in the column direction. This is because, taking into consideration a case where the gate circuit portion GDM has a function of switching the scanning directions allowing selection between a method for driving the 1st gate line 126 to the nth gate line 126 in this order and a method for driving the nth gate line 126 to the 1st gate line 126 in this order, the effect of the above-described improvement in display integrity and improvement in touch accuracy can be obtained in both cases. Incidentally, regarding connection of each shift register circuit provided in the gate circuit portion GDM and the first line 141, the order of the connection is determined taking into consideration the arrangement order of the gate line 126 and the first lines 141.

On the contrary, as shown in FIG. 15, the terminal portion for a touch line (second signal supply portions) 148B supplies the common signal to each of the touchlines 131 connected to all of the touch electrodes 130 provided in the first active area AA1 in the first writing period, and supplies the common signal to each of the touch lines 131 connected to all the touch electrodes 130 provided in the second active area AA2 in the second writing period. Incidentally, the terminal portion for a touch line 148B may be configured to supply the common signal to each of the touch lines 131 connected to all the touch electrodes 130 provided in the active area AA in both the first writing period and the second writing period. Regarding the touch detection, the first sensing period is performed at a timing after the first writing period is performed and before the second writing period is performed, and the second sensing period is performed after the second writing period is performed and before the first writing period included in the next frame writing period is performed. That is, the touch detection is performed twice in one frame writing period, and accuracy regarding the touch detection is higher than that in the above-described first embodiment. Thereby, even when a finger which is a position input body moves quickly, the movement can be detected properly. The terminal portions for a touch line 148B each supply the touch signal to each of the touch lines 131 connected to all the touch electrodes 130 provided in the active area AA in the first sensing period and the second sensing period. Incidentally, in FIG. 15, the illustration of the active area AA shaded represents the supply of the touch signals to all the touch electrodes 130.

According to the above technique, the terminal portions for a touch line 148B supplies the common signal to the touch line 131 in the first writing period and the second writing period where the gate line 126 and the first line 141 are scanned by the gate circuit portion GDM. On the other hand, the terminal portions for a touch line 148B supply the touch signal to the touch line 131 in the first sensing period which is a timing in the middle of performing scanning by the gate circuit portion GDM and in the second sensing period which is a timing at which the scanning by the gate circuit portion GDM reaches the other end. Thereby, since the position input performed by the finger which is a position input body can be detected twice, the accuracy regarding the touch detection becomes higher. By the way, for example, when the second writing period is performed after the first writing period and the first sensing period or when the first writing period is performed after the second writing period and the second sensing period, namely, when the scanning by the gate circuit portion GDM is restarted, two or more touch electrodes 130 forming an electric field between the touch electrodes 130 and the pixel electrode 124 connected to the pixel TFT 123 driven by the gate line 126 supplied with the scanning signal just after the restart are supplied with the common signal from the touchline 131, but a potential difference between the two or more touch electrodes 130 and the other two or more touch electrodes 130 may occur because of a voltage drop due to line resistance, and block-like or band-like display unevenness may be visually recognized. However, according to the present embodiment, when scanning by the gate circuit portion GDM is restarted in the first writing period or in the second writing period, since the drive signal is supplied to the first line 141 just before the restart, the two or more touch electrodes 130 forming an electric field between the touch electrodes 130 and the pixel electrode 124 connected to the pixel TFT 123 driven by the gate line 126 supplied with the scanning signal just after the restart can be retained at the same potential by the TFT 150 and the second line 142. Thereby, a situation becomes difficult to occur that the block-like or the band-like display unevenness is visually recognized when the scanning by the gate circuit portion GDM is restarted.

As described above, according to the present embodiment, regarding the TFT 150, the two or more TFTs 150 are arranged to connect the second line 142 and the two or more touch electrodes 130, and the second line 142 is connected to the two or more touch electrodes 130 via the two or more TFTs 150. By adopting such a configuration, when the two or more TFTs 150 are driven, the two or more touch electrodes 130 are short-circuited by the second line 142. Thereby, since the two or more touch electrodes 130 short-circuited are retained at the same potential, a potential difference becomes difficult to occur between the two or more touch electrodes 130 brought into the reference potential by the common signal supplied by the touch line 131. By adopting such a configuration, it is unnecessary to install a configuration (common signal supply line 45) for supplying the common signal to the second line 142, which is consequently preferred in terms of slimming the bezel configuration.

Further, as the second line 142, two or more second lines 142 are arranged to be spaced from one another in the extension direction of the first line 141, and the third lines 143 extending in parallel with the first line 141 and connected to the two or more second lines 142 is provided, and the first line 141 is connected to the two or more TFTs 150 connecting the second line 142 to the two or more touch electrodes 130. By adopting such a configuration, when the drive signal is transmitted to the first line 141, the two or more TFTs 150 are driven at the same timing, so that the two or more touch electrodes 130 are short-circuited by the second line 142. In addition, since the third line 143 is connected to the two or more second lines 142 arranged to be spaced from one another in the extension direction of the first line 141, the two or more touch electrodes 130 connected to each of the two or more second lines 142 via the two or more TFTs 150 are brought into the same potential. Thereby, a situation is made difficult to occur that a potential difference occurs between the two or more touch electrodes 130 arranged along the extension direction of the first line 141.

Further, the liquid crystal display device according to the second embodiment is provided with the gate line 126 extending in parallel with the first line 141 to transmit the scanning signal, the source line 127 extending in parallel with the second line 142 to transmit the image signal, the pixel TFT 123 connected to the gate line 126, the source line 127 and the pixel electrode 124, and driven by the scanning signal transmitted to the gate line 126 to supply the image signal transmitted to the source line 127 to the pixel electrode 124, and the gate circuit portion (signal supply portion) GDM connected to the gate line 126 and the first line 141 to supply the scanning signal and the drive signal to the gate line 126 and the first line 141, respectively. By adopting such a configuration, when the pixel TFT 123 is driven by the scanning signal transmitted to the gate line 126, the image signal transmitted to the source line 127 can be supplied to the pixel electrode 124, so that the pixel electrode 124 can be charged to the predetermined potential. The gate circuit portion GDM can supply the scanning signal and the drive signal to the gate line 126 and the first line 141 at their respective predetermined timings. As compared with a case where the signal supply portions connected to the gate line 126 and the first line 141, respectively, are individually installed, an arrangement space therefor can be reduced, which is consequently suitable in terms of slimming the bezel configuration.

Further, the liquid crystal display device according to the second embodiment is provided with the terminal portion for touch line (second signal supply portion) 148B for supplying the touch signal and the common signal to the touch line 131 in a time-divisional manner, and regarding the gate line 126 and the first line 141, two or more gate lines 126 and two or more first lines 141 are each arranged to be spaced from one another in the extension direction of the second line 142, the gate circuit portion GDM supplies the scanning signal and the drive signal to scan the two or more gate lines 126 and the two or more first lines 141 sequentially from one ends thereof toward the other ends thereof regarding the extension direction of the second line 142, the terminal portion for a touch line 148B supplies the common signal to the touch line 131 while scanning by the gate circuit portions GDM is being performed and supplies the touch signal to the touch line 131 at a timing in the middle of performing scanning by the gate circuit portion GDM and at a timing at which the scanning by the gate circuit portion GDM reaches the other end. By adopting such a configuration, the two or more gate lines 126 and the two or more first lines 141 arranged at intervals in the extension direction of the second lines 142 are sequentially supplied with the scanning signal and the drive signal, respectively, from the gate circuit portion GDM from one ends toward the other ends in the extension direction of the second line 142. The common signal is supplied from the terminal portion for a touch line 148B to the touch line 131 while scanning by the gate circuit portion GDM is being performed. On the other hand, the touch signal is supplied from the terminal portion for a touch line 148B to the touch line 131 at a timing in the middle of performing scanning by the gate circuit portion GDM and at a timing at which the scanning by the gate circuit portion GDM reaches the other end, so that the position input by a finger which is a position input body can be detected two or more times. Thereby, the accuracy in position detection becomes higher. Here, for example, when scanning by the gate circuit portion GDM is restarted after the touch signal by the terminal portion for a touch line 148B is supplied at a timing in the middle of scanning performed by the gate circuit portions GDM, two or more touch electrodes 130 forming an electric field between the touch electrodes 130 and the pixel electrode 124 connected to the pixel TFT 123 driven by the gate line 126 supplied with the scanning signal just after the restart are supplied with the common signals from the touch lines 131, but a potential difference occurs between the two or more touch electrodes 130 and the other two or more touch electrodes 130 because of a voltage drop due to a line resistance so that block-like or band-like display unevenness may be visually recognized. However, since the drive signal is supplied to the first line 141 just before the scanning by the gate circuit portions GDM is restarted, when scanning by the gate circuit portion GDM is restarted, the two or more touch electrodes 130 forming electric field between the two or more touch electrodes 130 and the pixel electrode 124 connected to the pixel TFT 123 driven by the gate line 126 supplied with the scanning signal just after the restart can be retained at the same potential by the TFT 150 and the second line 142. Thereby, when the scanning by the gate circuit portions GDM is restarted, a situation becomes difficult to occur that the block-like or the band-like display unevenness can be visually recognized.

Further, regarding the third lines 143, two or more third lines 143 are arranged to be spaced from one another in the extension direction of the second line 142, and the second lines 142 is divided into two or more divisional second lines 51 connected to the third lines 143 different from one another. By adopting such a configuration, since the two or more divisional second lines 51 constituting the second line 142 are connected to the different third lines 143, respectively, sets of two or more touch electrodes 130 arranged along the extension direction of the first line 141 can be retained at the same potential. Since the second line 142 is divided to the two or more divisional second lines 51, the number of overlaps of each divisional second line 51 with the other lines becomes less than the number of overlaps of the second line not divided with the other lines if the second line is not divided. Thereby, a parasitic capacitance between the other lines and each divisional second line 51 can be reduced. In addition, while the touch signals are being supplied to the two or more touch electrodes 130, a parasitic capacitance occurring via the second line 142 and the third line 143 between one of the two or more touch electrodes 130 arranged in a row along the X-axis direction and two or more touch electrodes 130 in another row can be reduced by dividing the second line 142 into the two or more divisional second lines 51. As described above, improvement in display integrity and improvement in position detection accuracy can be achieved.

Third Embodiment

A third embodiment will be described with reference to FIG. 16. In this third embodiment, a configuration of a common signal supply line 245 modified from the above-described first embodiment, or the like, is shown. Incidentally, redundant descriptions of a configuration, an action and an effect similar to those of the first embodiment will be omitted.

Figure 16:
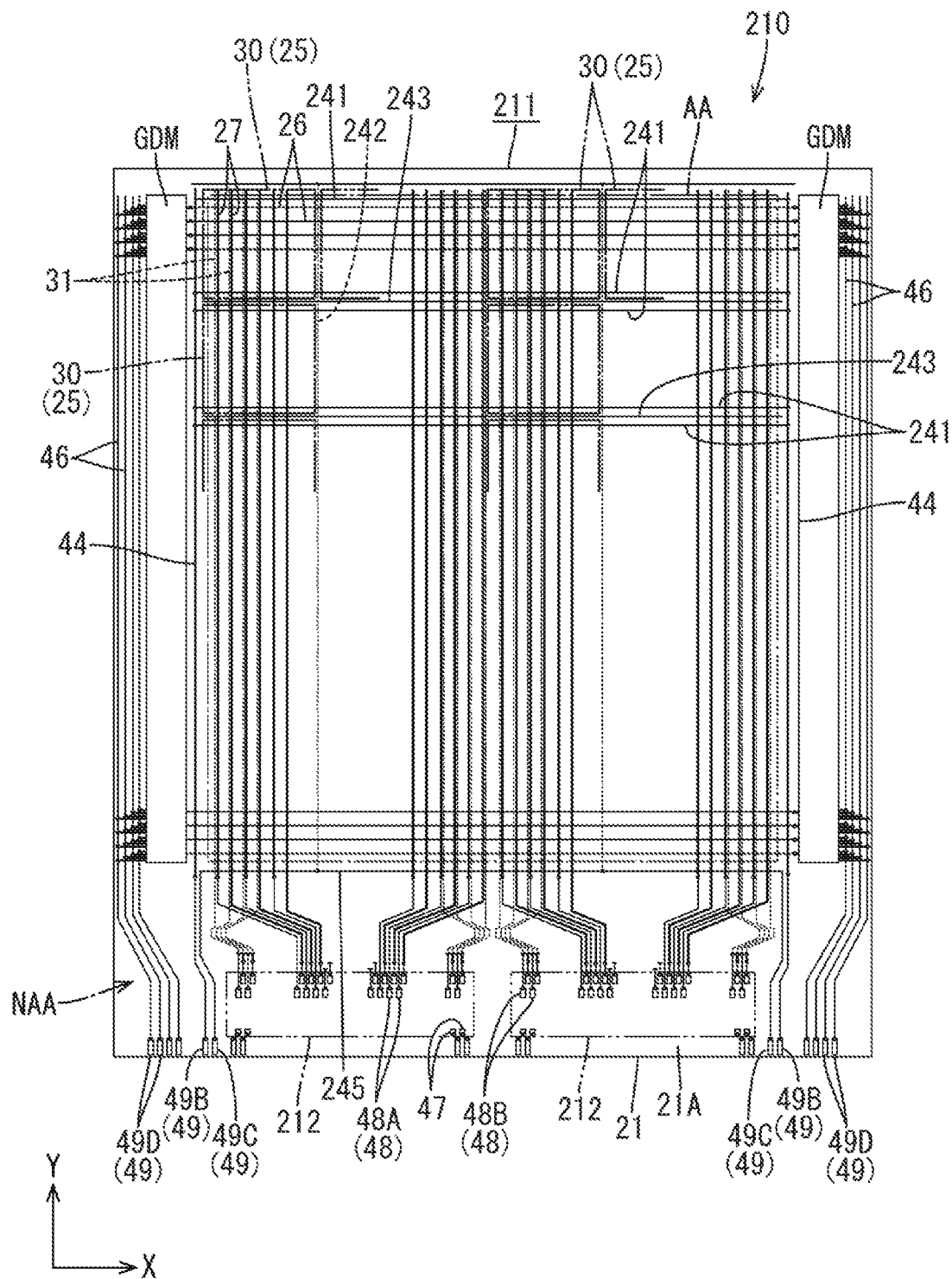
FIG. 16 is a plan view showing a touch electrode, a touch line, a gate line, a source line, and the like, in a liquid crystal panel according to a third embodiment.

As shown in FIG. 16, the common signal supply line 245 according to the present embodiment is not connected to a third line 243 of a second line 242 and the third line 243, and is selectively connected to the second line 242. By adopting such a configuration, when the second common signal is supplied from the common signal supply line 245 to the second line 242, the second common signal is also transmitted to the third line 243 connected to the second line 242. The common signal supply line 245 is arranged to be interposed between the active area AA and a mounting area of a driver 212, but is not arranged between the gate circuit portion GDM and the active area AA. Therefore, an arrangement space for the common signal supply line 245 in the X-axis direction (the extension direction of the first line 241 and the third line 243) is reduced, as compared with a case where the common signal supply line 45 is connected to both the second line 42 and the third line 43 like the first embodiment described above. This is suitable in terms of reducing a bezel width in the X-axis direction. In the present embodiment, a liquid crystal panel 211 is formed in a vertically-long rectangular shape, and the number of the drivers 212 is fewer than the number of drivers in the first embodiment by two, which is particularly suitable in such a vertically-long liquid crystal display device 210.

As described above, according to the present embodiment, the common signal supply line 245 is not connected to the third line 243 which is one of the second line 242 and the third line 243, and is selectively connected with the second line 242 which is the other thereof. By adopting such a configuration, when the second common signal is supplied from the common signal supply line 245 to the second line 242 which is the other of the second line 242 and the third line 243, the second common signal is also transmitted to the third line 243 which is one connected to the second line 242 which is the other. The arrangement space for the common signal supply line 245 can be reduced in the extension directions of the first line 241 and the third line 243, as compared with the case where the common signal supply line 245 is connected to both the second line 242 and the third line 243. This is suitable in terms of slimming the bezel configuration.

Fourth Embodiment

A fourth embodiment will be described with reference to FIG. 17. In this fourth embodiment, a configuration of a common signal supply line 345 modified from the above-described first embodiment or the like is shown. Incidentally, redundant descriptions of a configuration, an action and an effect similar to those of the first embodiment will be omitted.

As shown in FIG. 17, the common signal supply line 345 according to the present embodiment is not connected to a second line 342 of the second line 342 and a third line 343, and is selectively connected to the third line 343. By adopting such a configuration, when the second common signal is supplied from the common signal supply line 345 to the third line 343, the second common signal is also transmitted to the second line 342 connected to the third line 343. The common signal supply line 345 is arranged between the gate circuit portion GDM and the active area AA, but it is not arranged to be interposed between the active area AA and a mounting area of a driver 312. Therefore, an arrangement space for the common signal supply line 345 in the Y-axis direction (the extension direction of the second line 342) is reduced, as compared with a case where the common signal supply line 45 is connected to both the second line 42 and the third line 43 like the first embodiment. This is suitable in terms of reducing a bezel width in the Y-axis direction.

As described above, according to the present embodiment, the common signal supply line 345 is not connected to the second line 342 which is one of the second line 342 and the third line 343 and is selectively connected with the third line 343 which is the other thereof. By adopting such a configuration, when the second common signal is supplied from the common signal supply line 345 to the third line 343 which is the other of the second line 342 and the third line 343, the second common signal is also transmitted to the second line 342 which is one connected to the third line 343 which is the other. The arrangement space for the common signal supply line 345 can be reduced in the extension direction of the second line 342, as compared with the case where the common signal supply line 345 is connected to both of the second line 342 and the third line 343. This is suitable in terms of slimming the bezel configuration.

Other Embodiments

The technology described herein is not limited to the embodiments described above and with reference to the drawings, but, for example, the following embodiments are also included in the technical scope of the technology described herein.

(1) The second lines may include a second line arranged to overlap with the touch electrode. In this case, the second line arranged to overlap with the touch electrode is configured to be connected to the overlapping touch electrode via the TFT. At this time, it is preferred that the second line, if not divided, be connected to the two or more touch electrodes arranged in a column along the Y-axis direction via the two or more TFTs, respectively, but the technology described herein is not necessarily limited to such a configuration. Incidentally, even when the second line is divided into two or more lines, a configuration where the divisional second line is connected to the two or more touch electrodes arranged along the Y-axis direction via two or more TFTs, respectively, can also be adopted, but the technology described herein is not necessarily limited to such a configuration.

(2) The third lines may include a third line arranged to overlap with the touch electrode.

(3) It is possible to connect one or both of the second line and the third line to the gate circuit portion to omit the common signal supply line.

(4) It is possible to connect the first line to the gate circuit portion to omit the drive signal supply line. In this case, the drive signal can be supplied to the first line by utilizing a signal line for resetting or a start signal line provided in the gate circuit portion.

(5) It is obviously possible to divide the writing period into three or more. In this case, since the number of sensing periods included in one frame writing period is three or more, accuracy relating to the touch detection can be further improved.

(6) The specific number of divisions or the specific dividing position of the second line described in the above-described second embodiment can be modified where appropriate. For example, it is also possible to adopt a configuration where the divisional second line is connected to the two or more touch electrodes arranged along the Y-axis direction via the two or more TFTs, respectively.

(7) The source line and the touch line may be configured to be arranged in the same layer and arranged so as not to overlap with each other (for example, arranged to be spaced from each other in the X-axis direction, or the like) can be adopted.

(8) The touch line and the touch electrode may be configured to be arranged in the same layer. In this case, it is only necessary to form a slit between a touch electrode and a touch line which are not to be connected to separate them from each other.

(9) The pixel electrode may be composed of the second transparent film and the common electrode and the touch electrode may be composed of the first transparent electrode film.

(10) A specific screen size, resolution, or the like, of the liquid crystal panel can be modified where appropriate.

(11) A specific arrangement pitch of the pixel portions in the liquid crystal panel can be modified where appropriate.

(12) The number of drivers mounted on the array substrate can be modified where appropriate.

(13) The gate circuit portion may be omitted, and a gate driver having the same function as the gate circuit portion may be mounted on the array substrate. Further, the gate circuit portion may be provided only on one side portion of the array substrate.

(14) A specific planar shape of the pixel overlapping opening portion provided in the common electrode can be modified where appropriate. The planar shape of the pixel overlapping opening portion may be, for example, a V shape or a linear shape, or the like. Further, a specific number of installed pixel overlapping opening portions, a specific arrangement pitch thereof, or the like, can be modified where appropriate.

(15) The TFTs may be arranged in a matrix in plan view.

(16) The light-shielding portion may be provided on the array substrate side.

(17) The semiconductor film constituting the channel portion of the TFT may be made of polysilicon. In this case, it is preferred that the TFT be of the bottom gate type, or of a top gate type provided with the light-shielding film in a layer below the channel portion (on the side where the backlight device is installed).

(18) The touchscreen pattern may be of a mutual capacitance type.

(19) The technology described herein can also be applied to a reflective liquid crystal panel or a semi-transmissive liquid crystal panel.

(20) The planar shape of the liquid crystal display device may be a square, a circle, a semicircle, an oblong circle, an ellipse, a trapezoid, or the like.

The invention claimed is:

1. A display device having a position input function comprising:
a pixel electrode;
a common electrode arranged to at least partially overlap with the pixel electrode via an insulating film;
a plurality of position detection electrodes obtained by dividing the common electrode, the plurality of position detection electrodes forming an electrostatic capacitance between a positon input body performing position input and the position detection electrodes and detecting a position of the position input performed by the position input body;

a position detection line connected to the position detection electrode and supplying a position detection signal and a common signal for bringing the position detection electrode into a reference potential in a time-divisional manner;

a first line through which a drive signal is transmitted;

a second line extending to cross the first line; and a switching element connected to the first line, the second line and the position detection electrode, the switching element connecting the second line to the position detection electrode when driven by the drive signal transmitted to the first line.

2. The display device having a position input function according to claim 1, the display device further comprising:
   a common signal supply portion for supplying the common signal; and
   a third line extending in parallel with the first line and connected to the second line, wherein
   at least one of the second line and the third line is connected to the common signal supply portion.

3. The display device having a position input function according to claim 2, wherein the second line and the third line are each connected to the common signal supply portion.

4. The display device having a position input function according to claim 2, wherein one of the second line and the third line is not connected to the common signal supply portion and the other thereof is selectively connected to the common signal supply portion.

5. The display device having a position input function according to claim 2, wherein the third line is arranged between the position detection electrodes adjacent to each other in an extension direction of the second line.

6. The display device having a position input function according to claim 2, wherein the second line is arranged between the position detection electrodes adjacent to each other in an extension direction of the first line.

7. The display device having a position input function according to claim 6, wherein as the switching element, at least two switching elements are provided so as to be connected to the first line, the second line, and at least two of the position detection electrodes sandwiching the second line, respectively.

8. The display device having a position input function according to claim 2, the display device further comprising:
   a scanning line extending in parallel with the first line to transmit a scanning signal;
   a signal line extending in parallel with the second line to transmit an image signal;
   a pixel switching element connected to the scanning line, the signal line and the pixel electrode and driven by the scanning signal transmitted to the scanning line to supply the pixel electrode with the image signal transmitted to the signal line;
   a scanning signal supply portion connected to the scanning line to supply the scanning signal to the scanning line; and
   a drive signal supply portion arranged so as to be adjacent to the scanning signal supply portion, extending in parallel with the second line and connected to the first line to supply the drive signal to the first line.

9. The display device having a position input function according to claim 2, the display device further comprising:
   a scanning line extending in parallel with the first line to transmit a scanning signal;
   a signal line extending in parallel with the second line to transmit an image signal;
   a pixel switching element connected to the scanning line, the signal line and the pixel electrode and driven by the scanning signal transmitted to the scanning line to supply the pixel electrode with the image signal transmitted to the signal line; and
   a drive signal supply portion connected to the first line to supply the drive signal to the first line, wherein
   the drive signal supply portion supplies the drive signal to the first line at a timing before the scanning signal is transmitted to the scanning line, and stops supplying the drive signal to the first line while the scanning signal is being transmitted to the scanning line.

10. The display device having a position input function according to claim 2, the display device further comprising:
    a scanning line extending in parallel with the first line to transmit a scanning signal;
    a signal line extending in parallel with the second line to transmit an image signal;
    a pixel switching element connected to the scanning line, the signal line and the pixel electrode and driven by the scanning signal transmitted to the scanning line to supply the pixel electrode with the image signal transmitted to the signal line; and
    a drive signal supply portion connected to the first line to supply the drive signal to the first line, wherein
    the drive signal supply portion continues to supply the drive signal to the first line while the scanning signal is being transmitted to the scanning line.

11. The display device having a position input function according to claim 1, wherein
    as the switching element, a plurality of switching elements are arranged to connect the second line and the plurality of position detection electrodes, and
    the second line is connected to the plurality of position detection electrodes via the plurality of switching elements.

12. The display device having a position input function according to claim 11, wherein
    as the second line, a plurality of second lines are arranged so as to be spaced from one another regarding an extension direction of the first line,
    a third line extending in parallel with the first line and connected to the plurality of second lines is provided, and
    the first line is connected to the plurality of switching elements connecting the second line to the plurality of position detection electrodes.

13. The display device having a position input function according to claim 12, the display device further comprising:
    a scanning line extending in parallel with the first line to transmit a scanning signal;
    a signal line extending in parallel with the second line to transmit an image signal;
    a pixel switching element connected to the scanning line, the signal line and the pixel electrode and driven by the scanning signal transmitted to the scanning line to supply the pixel electrode with the image signal transmitted to the signal line; and
    a signal supply portion connected to the scanning line and the first line to supply the scanning signal and the drive signal to the scanning line and the first line, respectively.

14. The display device having a position input function according to claim 13, the display device further comprising a second signal supply portion for supplying the position detection signal and the common signal to the position detection line in a time-divisional manner, wherein
- as the scanning line and the first line, a plurality of scanning lines and a plurality of first lines are arranged at intervals in an extension direction of the second line, respectively,
- the signal supply portion supplies the scanning signal and the drive signal so as to sequentially scan the plurality of scanning lines and the plurality of first lines from one end to the other end in the extension direction of the second line, and
- the second signal supply portion supplies the common signal to the position detection line while scanning is being performed by the signal supply portion, and supplies the position detection signal to the position detection line at a timing in the middle of scanning performed by the signal supply portion and at a timing at which scanning performed by the signal supply portion reaches the other end.

15. The display device having a position input function according to claim 12, wherein
- as the third line, a plurality of third lines are arranged at intervals in the extension direction of the second line, and
- the second line is divided into a plurality of divisional second lines connected to the third lines different from one another.

* * * * *